United States Patent [19]
Darby et al.

[11] Patent Number: 5,318,224
[45] Date of Patent: Jun. 7, 1994

[54] METHOD AND APPARATUS FOR HEATING AND COOLING CONTROL

[76] Inventors: David Darby, R.R. #1, Orangeville, Ontario, Canada, L9W 2Y8; Richard Palmer, 14 Davies Crescent, Barrie, Ontario, Canada, L4M 2M3

[21] Appl. No.: 877,920

[22] Filed: May 4, 1992

[51] Int. Cl.⁵ .............................................. G05D 23/00
[52] U.S. Cl. .................................. 236/47; 165/11.1; 236/51
[58] Field of Search ................ 236/51, 47; 165/11.1; 379/102

[56] References Cited

U.S. PATENT DOCUMENTS

| | | | |
|---|---|---|---|
| 4,174,064 | 11/1979 | Pratt, Jr. | 236/51 X |
| 4,462,540 | 7/1984 | Dytch | 236/47 |
| 4,845,773 | 7/1989 | Attallah | 236/51 X |

*Primary Examiner*—William E. Wayner
*Attorney, Agent, or Firm*—Bereskin & Parr

[57] ABSTRACT

The present invention provides a system for controlling heating and cooling equipment in an energy efficient manner. The system comprises a microcontroller, a temperature sensor, a motion detector, a telecommunications interface and a control interface for the heating and cooling equipment. The system can override the thermostat control of the heating and cooling equipment and operate the equipment at a first set-back level and a second set-back level. The system will operate at the first set-back level if there is no motion for a predetermined period. The system will revert to thermostat control if motion is detected within a second predetermined period, otherwise the system will initiate operation at the second set-back level. The system will operate at the second set-back level until motion is detected or a control signal is received from a telephone. If thermostat control is initiated by a telephone, then the system will disable operation at the first set-back level until motion is detected. The system can be controlled by a telephone located in a remote location or in a room in the building containing the heating and cooling equipment.

10 Claims, 17 Drawing Sheets

5,318,224

METHOD AND APPARATUS FOR HEATING AND COOLING CONTROL

FIELD OF THE INVENTION

This invention relates to a system for controlling the heating and cooling of a room or building. In particular, the invention provides a computer-based system which can be operated using a telephone from local and remote locations.

BACKGROUND OF THE INVENTION

In most homes and buildings, heating and cooling is controlled by a thermostat. Typically, the occupant sets the thermostat to a desired temperature. The thermostat maintains the desired temperature by controlling the heating and cooling equipment. Conventional thermostats maintain the temperature setting whether or not a person is present in the room or building.

There will be instances where the occupant will leave the room or building for a period of time. When the occupant has left the room or house it is not necessary to maintain the temperature setting of the thermostat. Since heating and cooling is a major expense in maintaining most buildings, it is desirable to monitor the presence or absence of the occupant and to set back or reduce the heating (and cooling) output when the occupant is away from the building.

There are systems which set back the temperature when the occupant has left the room. These systems typically employ a motion sensor to detect the occupant's presence. When the occupant leaves, the system sets the temperature back to a first set-back. The first set-back temperature is typically such that the room temperature can be returned to the desired setting within a few minutes of the occupant returning. If the occupant is absent for a long period of time, the system sets the temperature to a second set-back which is usually considerably below the desired temperature. The problem with this system is that if the occupant returns the system will require a substantial period to restore the desired temperature because of the thermal inertia. For seasonal dwellings used infrequently, such as cottages and ski chalets, it may take many hours to restore the temperature to the comfort level desired by the occupants.

Clearly, it is desirable to have a system for controlling heating and cooling which provides for energy savings by setting back when the room or building is unoccupied. Accordingly, the present invention provides a heating control system which will set back the heating and cooling equipment when the room or building is unoccupied, and which will allow the heating and cooling equipment to be controlled by telephone from a remote location.

BRIEF SUMMARY OF THE INVENTION

In a first aspect, the present invention provides a system for controlling temperature change means which heats and/or cools a space, said system being responsive to control by a telephone connected to a telephone network, said system comprising: (a) controller means coupled to said temperature change means for controlling the operation of said temperature change means; (b) a temperature sensor, said temperature sensor coupled to said controller means, said temperature sensor having means for generating an output signal corresponding to a temperature sensed by said temperature sensor; (c) presence detector means coupled to said controller means and operative to generate a presence output signal representative of the presence or absence of a person in said space; (d) telecommunication interface means coupling said telephone system to said controller means; (e) said telecommunication interface means including means for receiving and answering a call from said telephone and further including means for receiving and decoding digits received from said telephone and for producing a communication signal dependent on such digits; (f) said controller means including means responsive to said temperature output signal and said communication signal for operating said temperature change means to change the temperature in said space dependent on the digits received from said telephone; (g) said controller means including setback means responsive to said presence output signal for operating said temperature change means at a first temperature setback level if no presence is detected in said space for a predetermined period of time; (h) said controller means including means responsive to receipt of a communication signal representative of at least one selected digit for disabling said setback means for at least a first selected period of time.

In a second aspect, the present invention provides a method of controlling the temperature in a space having a temperature change device for heating and /or cooling said space, and a temperature controller including presence sensing means for detecting the presence or absence of a person in said space and for automatically setting back the temperature in said space to a setback temperature if no person is present in said space for a predetermined period of time, said method including the steps of communicating with said temperature controller by telephone to restore the temperature in said space from said setback temperature, and concurrently disabling the step of automatically setting back the temperature in said space if no person is present in said space for said predetermined period of time, so that the temperature in said space will be restored from said setback temperature even in the absence of a person in said space.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION OF THE PREFERRED EMBODIMENTS

Figure 1:
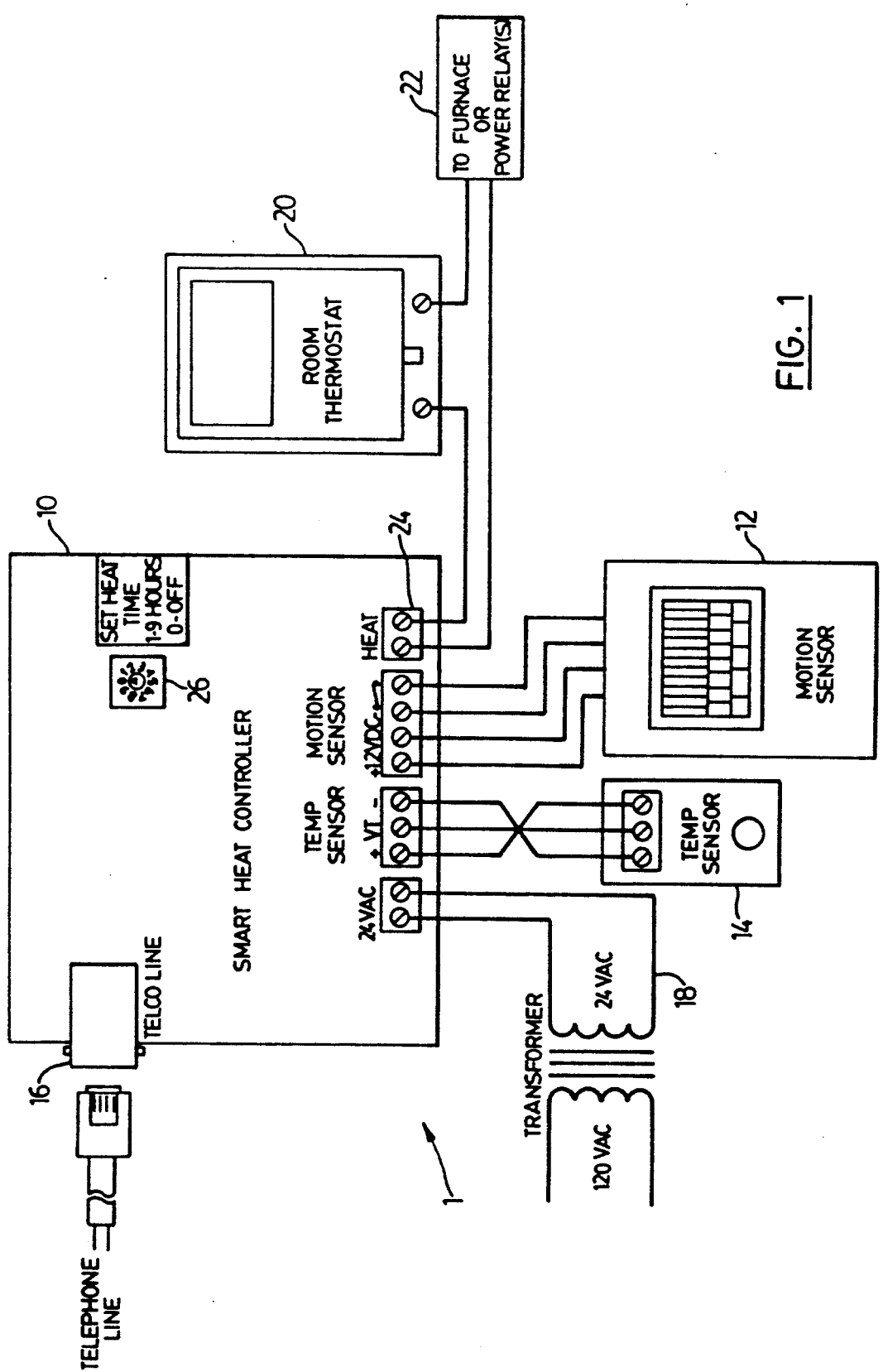
FIG. 1 shows in diagrammatic form the components of a heating control system according to the preferred embodiment of the present invention.

FIG. 1 shows in block form the preferred embodiment of a heating control system (indicated by the reference 1) according to the present invention. The heating control system 1 comprises a heat controller 10, a motion sensor 12, a temperature sensor 14 and a telecommunications interface 16. The heat controller 10 is powered by a transformer 18 which accepts 120 VAC, and provides a 24 VAC output to the heat controller 10. In operation, the heat controller 10 according to the present invention is used in conjunction with an existing thermostat 20 and conventional heating ventilation and air conditioning (HVAC) equipment 22.

As shown in FIG. 1, the heat controller 10 is wired in series with the thermostat 20. In this series configuration, the heat controller 10 can start the HVAC equipment 22, while the thermostat 20 ultimately controls the temperature according to its setting. The heat controller 10 connects in series to the thermostat 20 (and HVAC) through a heat control relay output 24. To minimize wiring, the heat controller 10 is typically located in the room which also has the thermostat 20. The motion sensor 12 is typically located in a room which has frequent human traffic. In most instances this room will also have a thermostat 20, thereby requiring minimal wiring for installing the heat controller 10.

To provide heating control, the heat controller 10 operates the heating equipment using heat cycles. A heat cycle involves activating the HVAC equipment 22 for a defined period of time. The period of the heat cycle can be set by the occupant using a heat cycle dial 26. As shown in FIG. 1, the heat cycle dial 26 is located on the front panel of the heat controller 10, thereby allowing easy access. In the preferred embodiment, the range of a heat cycle is 0 to 9 hours.

In operation, the heat controller 10 can initiate a heat cycle in two ways: (a) by detecting motion; and (b) by receiving a telephone key-press. Once the heat cycle is initiated, the HVAC equipment 22 will heat or cool the room or building according to the temperature set on the thermostat 20. During the heat cycle, the thermostat 20 controls the temperature setting in the room. Every time motion is detected by the sensor 12 (i.e. indicating the presence of an occupant), the heat controller 10 resets the heat cycle time thereby allowing the thermostat 20 to control the temperature. If the motion sensor 12 does not detect any motion for 2 hours, indicating that the occupant has left the room, then the heat controller 10 will override the thermostat 20 and lower the room temperature to a first set-back level. This first set-back level provides a temperature which conserves energy by lowering the heating output of the heating equipment 22, and a temperature which can quickly be raised to the setting on the thermostat 20 should the occupant return. As discussed above, the heat controller 10 initiates a heat cycle when motion is detected in the room. For a winter climate, a suitable first set-back level is 65 degrees F., whereas for a summer climate a suitable first set-back level would be 78 degrees F. and in that case, the heating equipment 22 would be air conditioning equipment.

The heat controller 10 maintains the room temperature at this first set-back level for the period of the heat cycle as set by the dial 26 and as controlled by temperature sensor 14. If the occupant returns to the room, then the sensor 12 will detect the motion and the heat controller 10 will initiate a new heat cycle thereby handing back room temperature control to the thermostat 20 for the period of the heat cycle. If the occupant does not return to the room and the heat cycle time expires, then the heat controller 10 will move the room temperature to a second set-back level (also using temperature sensor 14). This second set-back level is reached when the room has been unoccupied for 2 hours and the heat cycle time has expired. The assumption is that the occupant has left for a relatively long time and it is therefore not necessary to maintain the higher room temperature (or lower room temperature in summer). For example, the second set-back temperature for winter can be 45 degrees and the second set-back for summer can be 85 degrees. The heat controller 10 will maintain the second set-back temperature until another heat cycle is initiated.

As mentioned above, a heat cycle can be initiated by the motion sensor 12 or by the telephone. The heat cycle can be initiated by telephone by calling the telephone line to which the heat controller 10 is connected. The heat controller 10 will answer the line and then the heat cycle can be initiated by pushing a dial pad key, for example, the "#" key. Once the heat cycle is initiated, the thermostat 20 assumes control of the HVAC equipment 22 and brings the room temperature to the setting on the thermostat 20. When the heat cycle is initiated by telephone, the first set-back level (e.g. 65 degrees) is not enabled. This feature allows the thermostat 20 to bring the room temperature to the desired setting on the thermostat 20, which may take longer than 2 hours, especially if the room has been vacant and at the second set-back level (e.g. 45 degrees). However, once motion is detected, i.e. the occupant has arrived in the room, the first set-back is enabled and therefore if the occupant leaves the room for more than 2 hours the heat controller 10 will activate the first set-back.

In addition to activating the heat cycle by telephone, the heat controller 10 allows the heat cycle to be terminated by telephone. The heat cycle can be terminated by calling the heat controller 10 and pushing the "*" key. This causes the heat cycle to expire and in response the heat controller 10 sets the second set-back level (e.g. 45 degrees). Whenever, the heat cycle is terminated either by timing out or by telephone (i.e. "*" key), the heat controller 10 disables the motion sensor 12 for 3 minutes. This 3 minute period serves two functions. First, it allows the HVAC equipment 22 to equalize for a subsequent start-up, which is especially important for air conditioning systems. Secondly, the 3 minute period allows the occupant to leave the room without being detected by the sensor 12 and thereby reactivating the heat equipment (i.e. initiating a heat cycle).

The telecommunications interface 18 also provides the caller with an indication of the current state of the heat controller 10. If the heat cycle is active, i.e. the room is occupied, then the heat controller 10 answers the line after the sixth ring. On the other hand, if the heat cycle is off, i.e. room unoccupied and 45 degree set back, then the heat controller 10 will answer the line after the second ring. This feature allows the current temperature of a cottage, for example, to be ascertained from a remote location by simply using a telephone to call the heat controller 10.

The heat controller 10 also includes a power loss feature. If there is a power failure, the heat controller 10 reverts to the previous heating state when power is regained. For example, if the heat cycle was active, i.e. heat was on, when the power was interrupted, then the heat will be turned back on after power is regained. In addition, when power is first applied to the heat controller 10, there is a 10 second delay before the controller 10 becomes operational.

The heat controller 10 also incorporates a fail-safe design. Should the controller 10 become inoperative, the thermostat 20 will assume control of the HVAC equipment 22. The implementation of these functions in the heating control system 1 will be discussed by referring to the hardware and software structures utilized in the preferred embodiment of the present invention.

Figure 2:
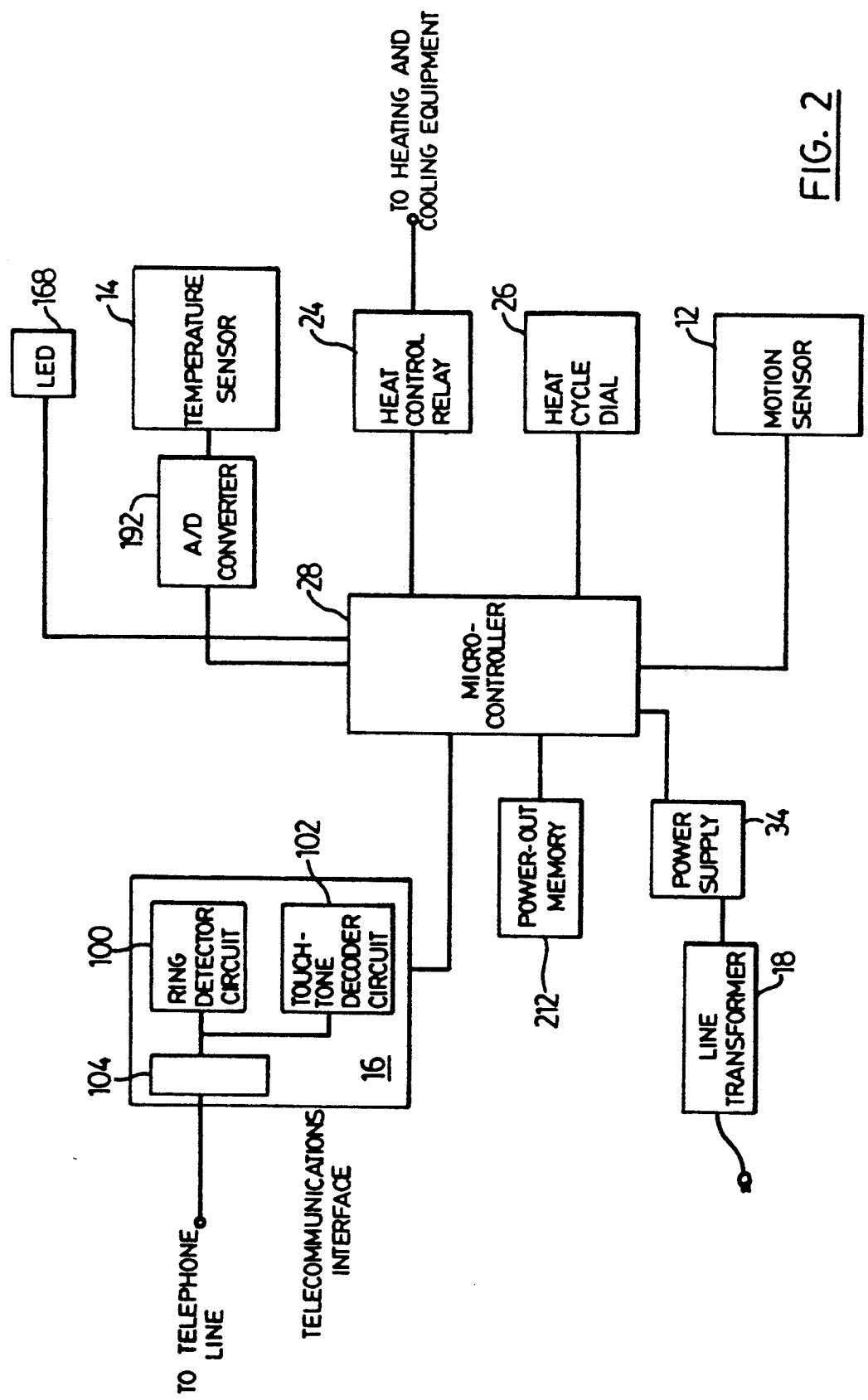
FIG. 2 is a diagrammatic representation of the functional blocks comprising the heating control system.

Reference will now be made to FIG. 2 which shows the functional blocks comprising the heat controller 10, and to FIG. 3 which shows the corresponding components of these functional blocks. The heart of the heat controller 10 is a microcontroller indicated by reference 28. As is known, a microcontroller is a single-chip microcomputer which includes various on-chip resources. The on-chip resources include program memory (i.e. Read Only Memory), data memory (i.e. Random Access Memory), timers, input/output ports and a serial communication port. It will be appreciated that a single-chip microcontroller offers the advantage of high performance in a small footprint, which results in a smaller printed circuit board and ultimately a compact heat controller 10. In the preferred embodiment, the microcontroller 28 utilized in the heat controller 10 is the eight-bit MC68HC705C8 which is manufactured by Motorola Inc.

In the preferred embodiment of the invention, the electronic components comprising the heat controller 10 are mounted on a main circuit board (not shown), and the components for the temperature sensor 14 are on a separate small circuit board (not shown). In known manner the circuit boards comprise printed circuit boards or PCBs. In the preferred embodiment, two-layer PCBs are used to provide a compact layout.

The heat controller 10 includes a power supply 34, which provides the DC voltages for operating the electronic circuitry. The power supply 34 is located on the main circuit board and is coupled to the 24 VAC taps on the power transformer 18. In known manner, the power supply 34 comprises a varistor 36 and a diode bridge 38. The varistor 36 helps to suppress any voltage spikes that may be present on the 24 VAC tap. The diode bridge 38, in known manner, converts the 24 VAC to rippled DC signal which is then smoothed by a capacitor 40. At this point the smoothed DC voltage signal is approximately 35 volts.

The electronic circuitry comprising the heat controller 10 requires two DC voltage levels: 12 volts and 5 volts. The power supply includes a 12 volt regulator 42 and 5 volt regulator 44. The 12 volt regulator 42 connects to the output of the capacitor 40 and provides a stable 12 volt DC supply rail 46. A suitable chip for the 12 volt regulator 42 is the 7812 manufactured by National Semiconductor. The 12 volt rail 46 is used to power the motion sensor 12, the heat control relay 24, and the external temperature sensor 14 and a relay (discussed below) on the telecommunications interface 18. A capacitor 48 can be included on the output of the regulator 42 to provide additional filtering of the 12 volt DC rail 46.

The 12 volt DC rail 46 also feeds the input of the 5 volt regulator 44. The 5 volt regulator 44 takes the 12 volt rail 46 and converts it into a 5 volt DC supply rail 50. The 5 volt DC rail 50 is used to power the microcontroller 28 and the remaining electronic circuitry. The 78L05 manufactured by National Semiconductor is suitable for the 5 volt regulator 44. As shown in FIG. 3, the 5 volt regulator 44 includes a capacitor 52 on its output to provide additional filtering. There is also a zener diode 54 to protect the 5 volt circuit components should the regulator 44 fail. If the regulator 44 fails, the zener diode 54 will shunt any voltages above 6 volts to ground. In known manner, it may be desirable to include additional filtering capacitors (not shown) across the input and output of the voltage regulators 42,44.

A principal function of the heat controller 10 is controlling the HVAC equipment 22 in order to achieve the desired room temperatures while saving energy when the room is unoccupied or vacant, e.g. first and second set-back levels. To control the HVAC equipment 22, the heat controller 10 includes a heat relay control circuit 56 which couples to the heat control relay output 24. The heat relay control circuit 56 comprises a relay 58 and a relay driver network 60.

The relay 58 in known manner provides for the control of the HVAC equipment 22 and interfaces to the HVAC equipment 22 through the heat control relay output 24. The relay 58 utilized in the preferred embodiment, has a normally closed contact, i.e. in the non-energized state, the relay 58 is closed. Under the control of the heat controller 10, the heat is off when the relay 58 energized, i.e. contact is open. On the other hand, the heat is on (i.e. under the control of the room thermostat 20) when the contact is closed, i.e. the relay 58 is de-energized. This provides a fail-safe feature which allows the room thermostat 20 to assume control of the HVAC equipment 22. Should the heat controller 10 fail, the relay 58 becomes de-energized and the contact closes as will be explained below.

The fail-safe feature is implemented through the relay driver network 60. The relay driver network 60 interfaces the microcontroller 28 to the heat control relay 58. To energize the relay 58 (and open the contact), the microcontroller 28 must provide a pulsed signal. As will be appreciated, if the microcontroller 28 fails, there will be no pulsed signal and the relay 58 will become de-energized causing the contact to close and the thermostat 20 to assume control of the heating equipment 22. As shown in FIG. 3, the driver network 60 connects to a output line 62 on the microcontroller 28. The microcontroller 28 generates a pulsed signal on the output line 62 for the driver network 60 to energize the relay 58.

The driver network 60 comprises a coupling capacitor 64, two diodes 66,68, a filter capacitor 70, a drive transistor 72, and two resistors 74,76. The output line 62 of the microcontroller 28 connects to the coupling capacitor 64. The capacitor 64 couples the pulsed signal generated by the microcontroller 28 to the first diode 66 which provides a level shift in the pulsed signal. The second diode 68 functions as a blocking diode and couples the level shifted signal to the filter capacitor 70. The filter capacitor 70 in turn smoothes the pulsed signal which feeds into the base of the drive transistor 72. The first resistor 74 limits the current into the base of the drive transistor 72. The other resistor 76 provides a discharge path (i.e. to ground) for the filter capacitor 70.

Figure 3:
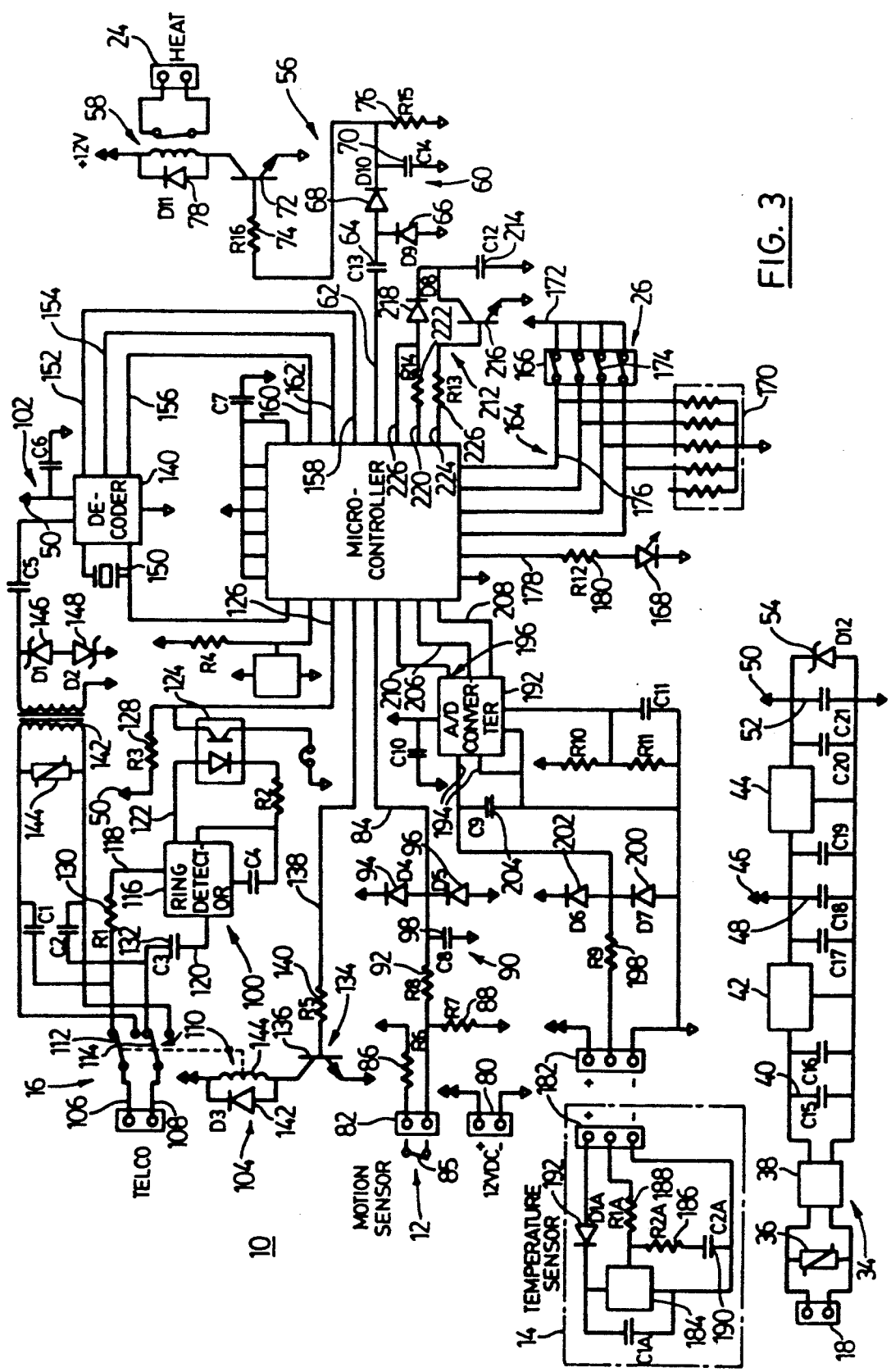
FIG. 3 is a detailed electronic schematic showing the components comprising the heating control system.

As shown in FIG. 3, the coil of the relay 58 connects between the 12 volt rail 46 and the collector of the drive transistor 72. The pulsed signal turns the transistor 72 on causing current to flow through the coil. In known manner, current flow in the coil creates a magnetic field which opens the normally closed contact, i.e. energizes the relay 58. If there is no pulsed signal, e.g. the microcontroller 28 has failed, then there will be no base current and the transistor 72 will be off, thereby causing the relay 58 to de-energize and the contact to close. In the preferred embodiment, the pulse signal for driving the relay 58 has a frequency of approximately 50 KHz. There is a diode 78 connected across the coil of the relay 58 to prevent a back voltage when the transistor 72 is turned off.

As discussed above, there are two ways of initiating a heat cycle. The first is through the motion detector 12 detecting movement inside the room. Referring still to FIG. 3, the motion sensor 12 is a separate unit which is coupled to the main circuit board 30 through two terminal blocks 80,82. The first terminal block 80 supplies the motion sensor 12 with power from the 12 volt rail 46, and with ground. The second terminal block 82 couples the output of the motion sensor 12 to an input line 84 on the microcontroller 28. A relay contact 85 in the motion sensor 12 generates the output signal. Normally, the relay contact 85 is open. Through the second terminal block 82 and a resistor 86, the relay contact 85 is energized. When the motion sensor 12 detects motion, the relay contact 85 closes and generates an output signal at zero volts, which is sensed by the microcontroller 28 on the input line 84. To protect the microcontroller 28 from the 12 volt supply rail 46 which is connected to the sensor 12, the input line 84 includes a pulldown resistor 88, and an input protection network 90. The input protection network 90 comprises a resistor 92, two diodes 94,96, and a capacitor 98. The resistor 92 limits current on the input line 84, and the capacitor 98 and diodes 94,96 prevent voltage spikes from reaching the microcontroller 28.

The other way of initiating a heat cycle is by using a telephone to call the heat controller 10 and input key command. The telecommunications interface, indicated by reference 16 in FIG. 3, implements this feature. The telecommunications interface 16 connects to a telephone line (FIG. 1) using a standard RJ11modular (i.e. teledapt) jack. The telecommunications interface 16 comprises a ring detector circuit 100, a DTMF (Dual Tone Multi Frequency, i.e. touch-tone) decoder circuit 102, and a telephone answer circuit 104.

As known by one skilled in the art, the telephone line comprises tip and ring leads 106,108. The tip and ring 106,108 carry the ringing voltage which activates the ringer in a telephone, in addition to the telephone control signals (e.g. off-hook, on-hook, DTMF tones) and the speech signals. In the context of the present invention, the telecommunication interface 16 uses the ring detector circuit 100 to monitor the tip and ring 106,108 for the ringing voltage (i.e. incoming call), which is answered using the telephone answer circuit 104, and then the touch-tone decoder 102 is used to decode the key presses transmitted from the calling telephone. The decoded key presses are then used by the microcontroller 28 to initiate/terminate the heat cycle.

As shown in FIG. 3, the telephone answer circuit 104 includes a double pole double throw (DPDT) relay 110, which couples the tip and ring 106,108 to the ring detector circuit 100 and the touch-tone decoder 102. The relay 110 has two normally closed contacts, indicated by 112 and 114 respectively. The normally closed position of the contacts 112,114 corresponds to an on-hook state, i.e. the telecommunications interface 16 is ready to accept an incoming call, while the open position of the contacts 112,114 corresponds to an off-hook state, i.e. the incoming call has been answered and speech (signal) path has been established.

In the normally closed position, the contacts 112,114 of the relay 110 couple the tip and ring 106,108 to the ring detector circuit 100. The ring detector circuit 100 comprises a ring detector chip 116. A suitable ring detector chip 116 is the TCM1520A manufactured by Texas Instruments Inc. The ring detector 116 has two AC inputs 118,120 for connecting to the tip and ring 106,108. As shown in FIG. 3, one contact 112 (in the closed position) connects the tip 106 to the AC input line 118 of the ring detector 116, and the other contact 114 (also in the closed position) connects the ring 108 to the other AC input line 120 of the detector chip 116. When the ring detector 116 detects a ringing voltage on the tip and ring 106,108, it produces a signal on output line 122. This output signal is coupled by an opto-isolator 124 to an input line 126 on the microcontroller 28. The opto-isolator 124 is necessary to isolate the ringing voltage which can damage the microcontroller 28. In known manner, the opto-isolator 124 comprises a light emitting diode (not shown) and a photo-transistor (not shown). When a ringing voltage is detected, the detector 116 output line 122 goes high, which turns on the opto-isolator (i.e. the phototransistor conducts) causing its output to go low, and thereby pulling the input line 126 low. A resistor 128 connected to the input line 126 and the 5 volt rail 50 acts a pull-up, to keep the input line 126 in a normally high state.

As also shown in FIG. 3, the AC input 120 of the ring detector chip 116 includes a resistor 130 which limits the current from the tip lead 106. The other AC input 120 includes a capacitor 132, which provides DC blocking.

When there is an incoming call, i.e. a ringing voltage, the microcontroller 28 senses a low on the input line 126. To answer the call, the microcontroller 28 uses the telephone answer circuit 104. The telephone answer circuit 104 comprises the relay 110 discussed above and a driver 134 for controlling the relay 110. The driver 134 comprises a transistor 136 which connects the relay 110 to an output line 138 on the microcontroller 28. The transistor 136 provides the necessary current to turn on the relay 110, i.e. moving the contacts (112,114) to the open position. To turn on the relay 110, the microcontroller 28 brings the output line 138 high; this causes the transistor 136 to turn on and sink the current required to energize the relay 110 and open the contacts (112,114). As shown in FIG. 3, the transistor 136 has a resistor 140 on its base to limit the base current. In addition, the relay 110 includes a diode 142 across its coil (reference 144) to prevent a back voltage when the transistor 136 is turned off.

Energizing the relay 110 (i.e. through the transistor) moves the contacts 112,114, from their position as drawn, to the normally open position. In the normally open position, the tip and ring leads 106,108 are connected to the touch-tone decoder circuit 102. The touch-tone decoder circuit 102 comprises a DTMF decoder chip 140 and a line transformer 142. As shown in FIG. 3, the transformer 142 couples the tip and ring leads 106,108 to the decoder chip 140. It will be appreciated that the primary function of the transformer 142 is to couple the decoder chip 140 to the tip and ring 106,108 and to isolate the voltage level on the tip and ring leads 106,108 to protect the decoder chip 140. For additional protection from voltage spikes on the tip and ring 106,108, the decoder circuit 102 includes a varistor 144 across the primary winding of the transformer 142. Similarly across the secondary winding of the transformer 142, there are two zener diodes 146,148 which are arranged in a back-to-back configuration, to shunt any voltage spikes (positive and negative) that appear on the secondary winding of the transformer 142. The breakdown voltage of the zener diodes 146,148 is 5.1 volts.

Referring still to FIG. 3, the secondary winding of the transformer 142 feeds the signal (e.g. touch tone) on the tip and ring 106,108 into the decoder 140. The decoder 140 is a single package integrated circuit that converts DTMF signals into 4-bit serial data. A suitable device for the decoder 140 is the MT3270 manufactured by Mitel Corporation. The decoder 140 is powered from the 5-volt supply rail 50. In addition, the decoder 140 requires a time-base oscillator to operate, which is provided by a crystal 150. The crystal 150 also provides the time-base oscillation for the microcontroller 28.

The microcontroller 28 connects to the decoder 140 on three lines: a serial data line 152, a data clock line 154, and a data ready line 156. The serial data line 152 and data ready line 156 each connect to respective input lines 158,160 on the microcontroller 28, and the data clock line 154 connects to an output line 162 on the microcontroller 28. When a touch-tone signal is received, the decoder 140 brings the data ready line 156 high. In response, the microcontroller 28 generates clock pulses on the data clock line 154 in order to shift out the 4-bit data on the data line 152, which is then read (bit-by-bit) by the microcontroller 28 on the input line 158. The 4-bit data corresponding to the decoded touch-tone is then saved in memory and processed by the software as will be discussed below.

The function of the heat cycle dial 26 is to set the period of the heat. This function can be implemented by a heat cycle dial circuit 164 as shown in FIG. 3. The circuit 164 comprises a switch 166, a light emitting diode (LED) 168, and a resistor network 170. The switch 166 is a rotary BCD (i.e. binary coded decimal) switch. The switch 166 converts the heat cycle setting (i.e. 0 to 9, shown in FIG. 1) into a binary coded decimal format which is read by the microcontroller 28. The switch 166 has a common terminal 172 and four switch terminals 174. The common terminal 172 is connected to the 5-volt supply rail 50 and the four switch terminals 174 are connected to four input lines 176 on the microcontroller 28. The four input lines 176 are also pulled down to ground using the resistor network 170.

The heat cycle status, i.e. active or inactive, of the heat controller 10 is indicated by the LED 168. The LED 168 connects to an output line 178 on the microcontroller 28 and includes a resistor 180 to limit the current. LED 168 indicates the state of the system, as will be described.

As discussed above a principal function of the heat controller 10 is to generate the two set-back levels (e.g. 65 degree set-back and 45 degree set-back). The 65 degree set-back occurs if the room is unoccupied for more than 2 hours. If the room continues to be unoccupied for the period of the heat cycle (which can be 0 to 9 hours as set on the heat cycle dial 26), then the heat controller 10 lowers the temperature to the second set-back level, i.e. 45 degrees. As with the other heat controller 10 functions, the set-back function is implemented by a combination of software and hardware. Referring to FIG. 3, the hardware associated with the set-back function is the temperature sensor 14 and the heat control relay output 24.

The temperature sensor 14 (at the left bottom of FIG. 3) is located on the small circuit board (not shown) and is coupled to the heat controller 10 using a terminal block 182 having three connectors. Two connectors supply power (12 volt supply rail and return) to the temperature sensor 14, and the third connector provides the heat controller 10 with a voltage signal corresponding to the temperature of the room. The main component of the temperature sensor 14 is a temperature sensing device 184 (the LM34C manufactured by National Semiconductor) which generates an output voltage signal corresponding to the temperature. The temperature device 184 outputs 10 mV per degree Fahrenheit. For example, a temperature of 70 degrees in the room would be converted into a 700 mV signal. Two resistors 186,188 and a capacitor 190 provide buffering for the output signal from the temperature device 184, as shown in FIG. 3. There is also a diode 192 on the lead connected to the 12 volt supply rail 46 to protect the device 184 in case the power to the circuit board is reversed.

On the main circuit board (not shown), the output voltage signal from the temperature sensing device 184 feeds into an analog-to-digital (A/D) converter 192. In known manner, the A/D converter 192 converts the voltage signal (analog value) into a digital code which can be used by the microcontroller 28. A suitable A/D converter 192 is the ADC0831 manufactured by National Semiconductor Inc. The A/D converter 192 has an analog signal input port 194 and a serial data output port 196. The analog input 194 couples to the terminal block 182 through an input protection network comprising a resistor 198, and two diodes 200,202. The resistor 198 limits current to the analog input 194, and the diodes 200,202 shunt any voltage spikes on the input 194. As shown in FIG. 3, a capacitor 204 is connected across the input port 194 (which is differential) of the A/D converter 192. The capacitor 204 together with the resistor 198 filters the output voltage signal provided by the temperature sensing device 184. There are also two additional resistors 206,208 for setting the reference voltage for the A/D converter 192.

The A/D converter 192 interfaces to the microcontroller 28 through the serial data output port 196 which comprises a chip select input, a serial data output, and a clock input. The chip select input connects to an output line 206 on the microcontroller 28. The serial data output connects to an input line 208 on the microcontroller 28 and provides the serial data input to the microcontroller 28. The clock input connects to an output line 210 on the microcontroller 28. To initiate an analog to digital conversion, the microcontroller 28 brings the chip select line (input 206) low. The microcontroller 28 then generates clock pulses, through software, on the clock line (input 210) to shift the serial data from the A/D converter 192 onto the data line (input 208). The serial data is stored in memory by the microcontroller 28 and processed by the software as will be explained below.

The last principal feature of the circuit for the heat controller 10 is the power-out memory function. If the heat controller 10 loses power, then upon regaining power one of the first operations of the microcontroller 28 is to determine whether the heat was on or off before the power failure. The heat state is provided by a power-out memory circuit 212. The power-out memory circuit 212 comprises a storage capacitor 214, a discharge transistor 216 and a blocking diode 218.

The heat state is stored as a charge on the capacitor 214. In the preferred embodiment, a charge on the capacitor 214 corresponds to the state heat on, whereas a discharged capacitor corresponds to heat off. To save the heat state, the microcontroller 28 charges or discharges the storage capacitor 214. If the heat is on, then the microcontroller 28 charges the capacitor 214 using an output line 220 which connects to the capacitor 214 through the blocking diode 218 and a resistor 222. By bringing the output line 220 high, the diode 218 is forward biased and the capacitor 214 is allowed to charge. When the output line 220 is brought low, the diode 218 blocks the capacitor 214 from discharging, and the discharge of the capacitor 214 is controlled by the microcontroller 28 through the transistor 216. The base of the transistor 216 connects to another output line 224 on the microcontroller 28 through a resistor 226, which limits the current to the base of the transistor 216. The collector of the transistor 216 connects to the capacitor 214. When the transistor 216 is turned on, i.e. by bringing the output line 224 high, the transistor 216 provides a discharge path ground.

The microcontroller 28 uses an input line 226 to read the storage capacitor 214. The input line 226 connects in between the resistor 222 and the anode of the diode 218. To read the capacitor 214, the microcontroller 28 pulses the output line 220 and reads the input line 226. If the input line 226 is high during the pulse, then the capacitor 214 is charged. The input line 226 will be high because the diode 218 cannot be forward biased if the capacitor 214 is charged. Conversely, if the capacitor 214 is discharged (i.e. heat is off), then the input line will be low. When the output line 220 is pulsed, the diode 218 will turn on and consequently the input line 226 will read a low voltage, thereby indicating that the capacitor 214 is discharged and heat is off.

In the foregoing discussion, the hardware required to implement the various functions of the heat control system 1 has been explained in detail. As will appreciated by one skilled in the art, software (also known as firmware when programmed in read only memory) is the other principal component of a microprocessor-based system. In the following discussion, the structure of the software required to control the hardware is presented.

In the preferred embodiment of the present invention, the software (also known as firmware) for the heat controller 10 runs in a real-time or polling loop structure. As will be appreciated by one skilled in the art, in the present invention a polling loop structure allows for accurate time-keeping for the heat cycles (i.e. heat on, first set-back, second set-back). A polling loop structure also generates the delays required by the various modules in the software program.

Figure 4:
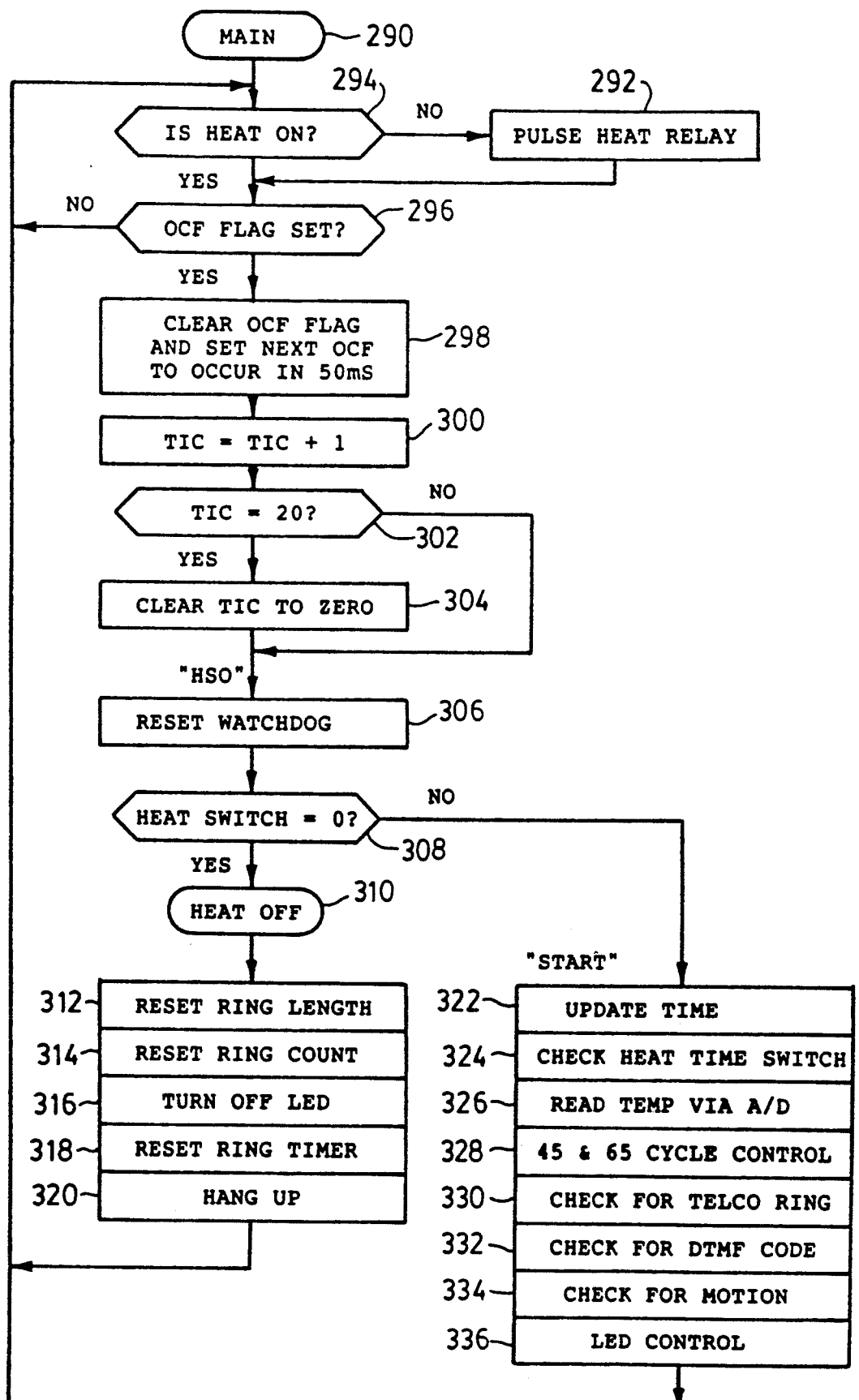
FIG. 4 is a flow chart depicting the software for the initialization procedure.
Figure 5:
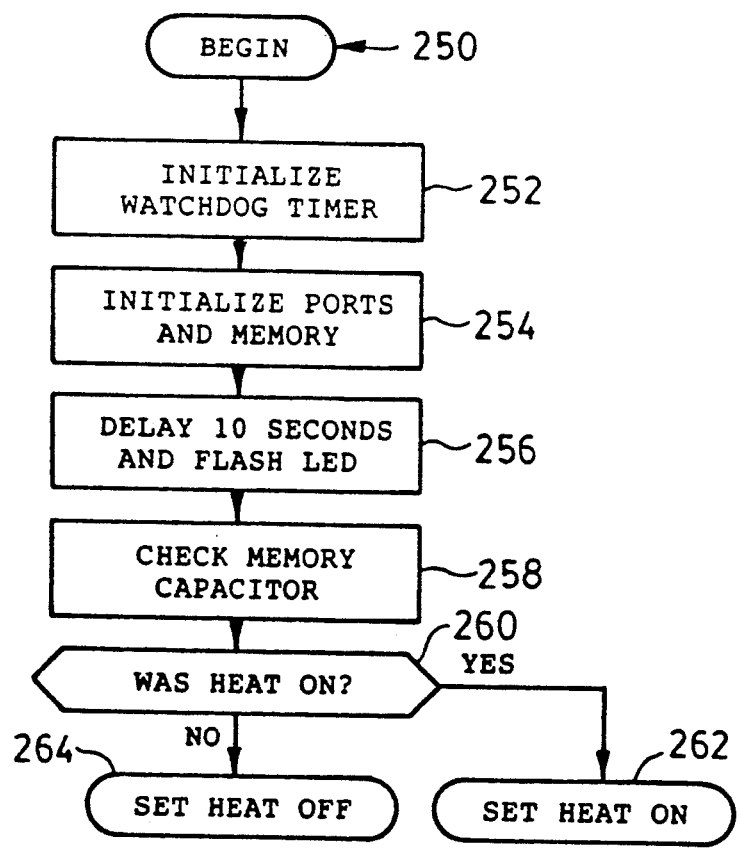
FIG. 5 is a flow chart showing the top level of the software.

When the heat controller 10 is first powered up, the software executes an initialization procedure indicated by reference 250 (FIG. 5). The software then continues to cycle through a main polling loop (FIG. 4) executing a series of procedures every 50 milliseconds. The primary functions of the main loop 250 are to generate an accurate time-base for a real-time clock which is used for timing the various functions of the heat controller 10 and to service various procedures (or subroutines) based on the setting of the heat cycle dial.

Referring to FIG. 5, the initialization procedure 250 comprises various operations to configure the on-chip resources of the microcontroller 28 and to put the various hardware elements into a known state. The first operation indicated by block 252 in the initialization procedure is enabling the watch-dog timer. As is known, the watch-dog timer, or software sanity timer, ensures that the microcontroller 28 is executing the software properly. If the software is executing properly, then it will reset the watch-dog timer at periodic intervals. On the other hand, if the software has gone awry, it will not reset the watch-dog causing it to timeout and generate a reset which restarts execution of the software program. The present invention utilizes the on-chip watch-dog timer (not shown) of the microcontroller 28. Once the watch-dog is enabled, i.e. block 252, the software must continuously reset ("kick") the watch-dog every 250 milliseconds to avoid time-out generated reset.

The next operation, block 254, in the initialization procedure 250 involves configuring the input/output lines which control the various hardware elements, for example, the temperature sensor 14, the motion sensor 12, and the heat control relay output 24. Configuring the input/output lines requires writing binary data to control registers in the microcontroller 28 according to the specifications of the MC68HC705C8.

The third operation, reference block 256, in the initialization procedure 250 involves entering a delay loop (not shown) and flashing the LED 168. The flashing LED 168 provides a visual indication that the heat controller 10 was recently powered up. Since this loop delays for 10 seconds, it is necessary to reset or kick the watch-dog timer while the software cycles in this loop.

The fourth operation, indicated by block 258, has the microcontroller 28 scanning the storage capacitor 214. As discussed above, the microcontroller 28 uses the input line 226 to scan the capacitor 214 and determine whether the heat state is on or off. If the capacitor 214 is charged, then the heat is on. On the other hand, if the capacitor 214 is not charged, then heat is off.

The last operation in the initialization procedure involves setting the heat control relay on or off depending on the heat state. According to the value of the heat state (i.e. the charge on the storage capacitor 214), the software either branches, at decision block 260, to a set heat-on procedure 262 or to a set heat off procedure 264.

Figure 6:
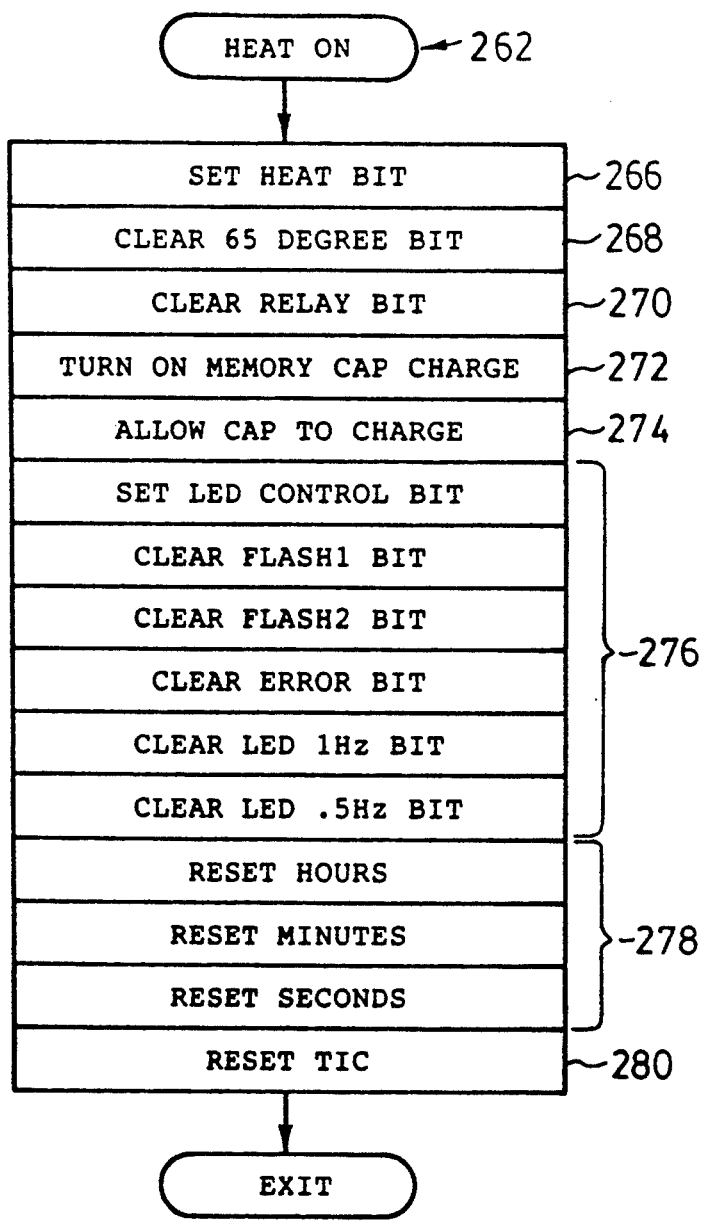
FIG. 6 is a flow chart depicting the software for the heat-on procedure.

The set heat on procedure is shown in FIG. 6. The first operation in the procedure 262 is to update three software status bits: a heat bit (block 266), a 65 degree bit (block 268), and a heat relay control bit (block 270). The software sets the heat bit to indicate that the heat is on. The 65 degree bit is cleared because when heat is on, the 65 degree set-back is off. The heat relay control bit indicates the state of the heat control relay 58, which is cleared for heat on. For heat on, the software clears the heat relay control bit, and the software uses the value of this bit in the main loop to pulse the heat control relay. The next operation, blocks 272 and 274, in the procedure 262 is to charge the storage capacitor to indicate that heat is on.

The software then updates a LED control word corresponding to the state of the LED 168 (block 276). In the preferred embodiment of the present invention, the LED 168 has seven possible states: (1) steady-on to indicate heat on; (2) blink to indicate a trigger from motion sensor 12 or phone code; (3) flash at 10 Hertz for 65 degree set-back active; (4) flash at 5 Hz for 45 degree set-back active; (5) flash at 1 Hz for 65 degree set-back off; (6) flash at 0.5 Hz for 45 degree set-back off; and (7) steady blinking during initial power-up. For heat on, the software sets the LED on bit and clears the other LED bits in the control word. The last operation in the heat-on procedure is to clear the real-time clock (block 278) and a tick variable used by the real-time clock (block 280).

Figure 7:
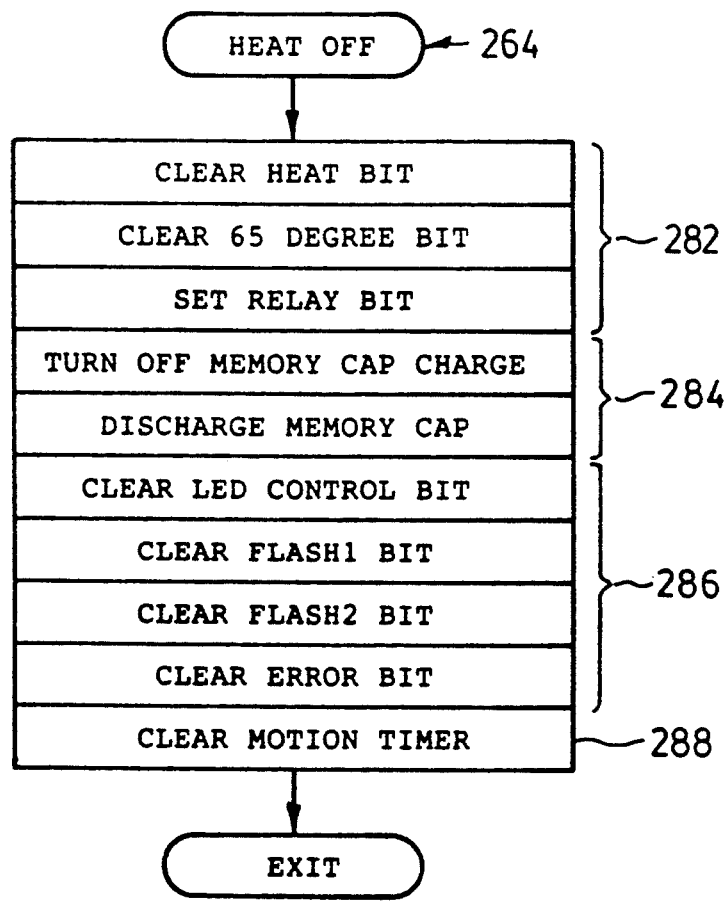
FIG. 7 is a flow chart depicting the software for the heat-off procedure.

If the heat state is off, then the software branches to the heat-off procedure 264 shown in FIG. 7. The first operation in the heat-off procedure is to update the heat status word in block 282. The second operation involves discharging the storage capacitor (block 284) to indicate that the heat is off, i.e. the thermostat 20 is controlling the heating equipment 22. The heat-off procedure 264 then clears the LED control word (block 286). Lastly, the heat-off procedure disables the motion sensor 12 for 3 minutes by clearing a 180 second variable in block 288.

After the software executes the initialization procedure 250, the software moves to the main polling loop indicated by reference 290 in FIG. 4.

Referring to FIG. 4, the first operation in the main loop 290 is servicing the heat control relay 58. The software pulses the heat control relay 58 (block 292) if the heat is off in decision block 294. As discussed previously, the heat control relay 58 is pulsed (i.e. relay is energized) if the heat is off. If the heat is on, then it is not necessary to pulse the heat control relay 58, and the software moves to the next operation.

The next operation in the main loop 290 is generating the time-base. The software uses a 50 millisecond time-base. The 50 millisecond time-base is generated by a hardware counter (not shown) within the microcontroller 28. Each time 50 milliseconds expires, the hardware counter sets a flag. In decision block 296, the software checks this flag. If the flag is not set, then the software idles until the 50 milliseconds expires. If the flag is set, i.e. 50 milliseconds has elapsed, then the software clears the flag and resets the counter so that it will count another 50 millisecond tick (block 298).

After clearing the flag, the main loop increments a software counter, i.e. "tick", in block 300. In the next block 302, the software checks if the value of this software counter is 20. A value of twenty corresponds to one second (i.e. 20×50 milliseconds), and the software clears the software counter to indicate that one second has elapsed in block 304. As will be explained below a time keeping procedure 338 monitors the software counter to service a real time clock.

In the next block 306, the software resets the watch-dog timer. Since this branch of the main loop is executed once every 50 milliseconds, the watch-dog timer is reset 250 millisecond period. Accordingly, the watch-dog timer ensures the orderly functioning of the software.

After resetting the watch-dog timer, the software reads the heat cycle dial 26, i.e. the binary coded decimal value. If the value of the heat dial 26 has been set to zero hours (block 308), then the heat cycle is zero and the heat should be turned off. Accordingly, the software calls the heat-off procedure 264 (block 310). After servicing the heat-off procedure 264 (FIG. 7 discussed above), the software resets a ring length variable in block 312, a ring count variable in block 314, and a ring timer variable in block 318. The software also calls a LED control procedure 316 to turn off the LED 68. The last operation when the heat state is off involves putting the telecommunications interface 16 in an on-hook state or hanging up so that the heat controller 10 is ready to accept an incoming call.

Figure 8:
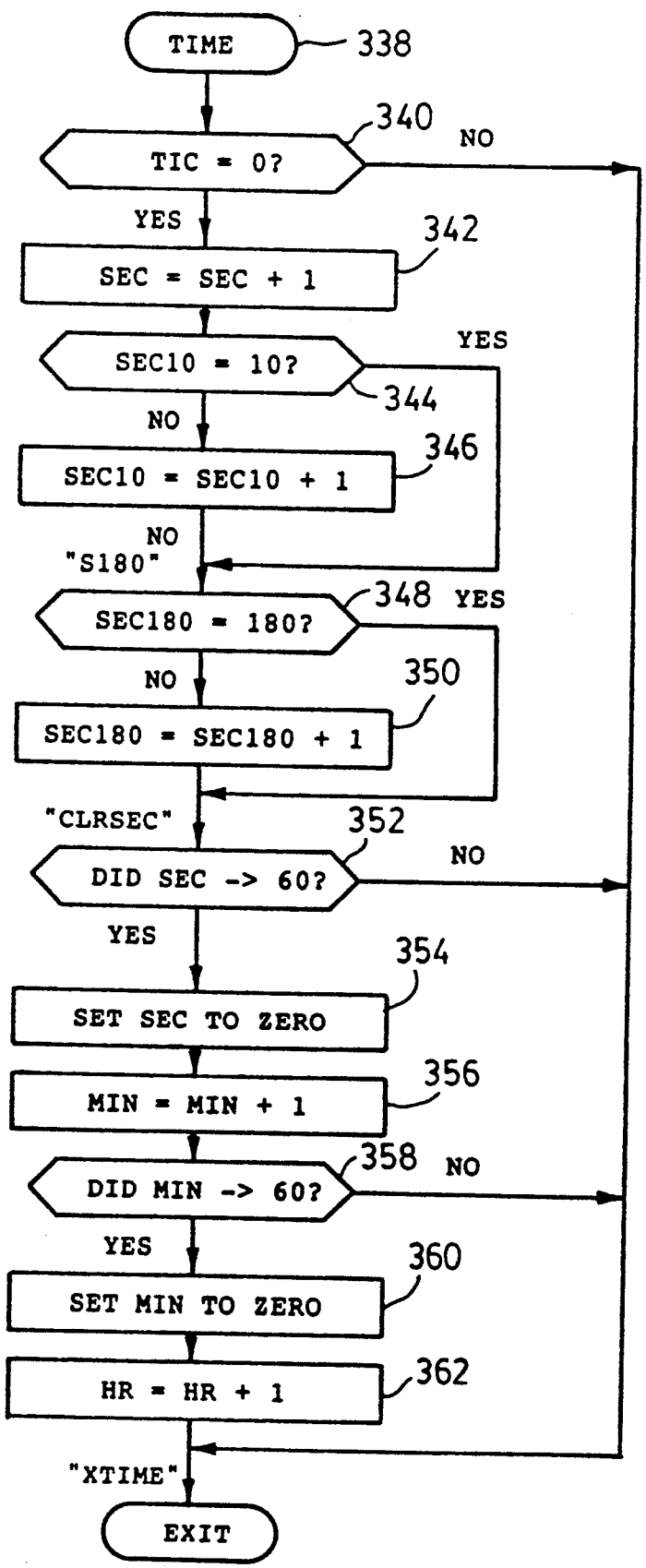
FIG. 8 is a flow chart depicting the software for generating the local real-time clock.

If the heat cycle dial 26 is not set at zero hours, then the heat controller 10 retains control of the heating equipment 22 and performs a series of service operations. The first operation involves calling the time-keeping procedure in block 322. The time-keeping procedure shown in detail in FIG. 8, updates the real-time clock which is used to time the duration of the heat cycles. The time-keeping procedure also generates two other timers; one is a ten-second timer, which is used in servicing the telecommunications interface 16. The other timer is the 180-second timer, which is used to disable the motion sensor 12 for 3 minutes after the heat has been turned.

The first operation in the time-keeping procedure 338 (FIG. 8) is to check if one second has expired (block 340), i.e. the tick variable equals 20. If one second has not expired, then software program returns to the main loop 290. If one second has expired, then a seconds variable is incremented in block 342. The next two operations update the 10-second timer (blocks 344,346) and the 180-second timer (blocks 348,350). The procedure then checks if the seconds variable is equal to 60 (i.e. 1 minute) in block 352. If true, then the seconds variable is set to zero (block 354) and a variable corresponding to minutes is incremented in block 356. The procedure 338 then checks in block 358 if the minutes variable is equal to 60 (i.e. 1 hour has elapsed). If one hour has elapsed, then the minutes variable is set to zero (block 360), and a variable for hours is incremented (block 362), and program execution returns to the main loop 290.

Figure 9:
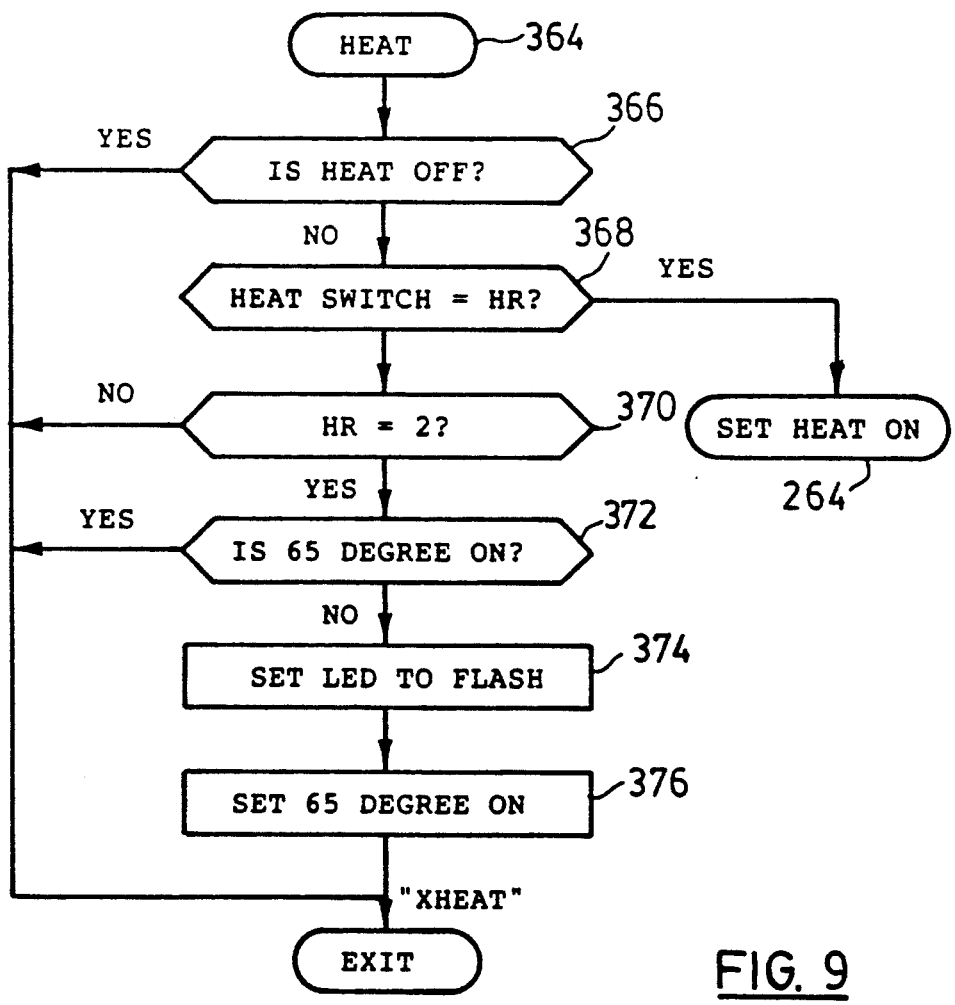
FIG. 9 is a flow chart depicting the software for operating the heating control relay.

The next procedure called from the main loop 290 (FIG. 4) from block 324 is a procedure 364 (FIG. 9) which keeps track of how long the heat has been on (i.e. under the control of the heat controller 10). Referring to FIG. 9, the heat procedure 364 first checks if the heat is on in block 366. If the heat is on, the procedure in 368 determines if the heat has been on for the number of hours set on the heat cycle dial 26. If true, the heat-off procedure 264 (FIG. 7) is called. If false, the heat procedure 364 checks if 2 hours have expired in block 370. If 2 hours have lapsed and the 65 degree set-back has not been set (block 372), then the 65-degree set-back is set and the LED control word is set for the one second flash rate (blocks 374,376). The program execution then returns to the main loop 290 (FIG. 4).

Figure 10:
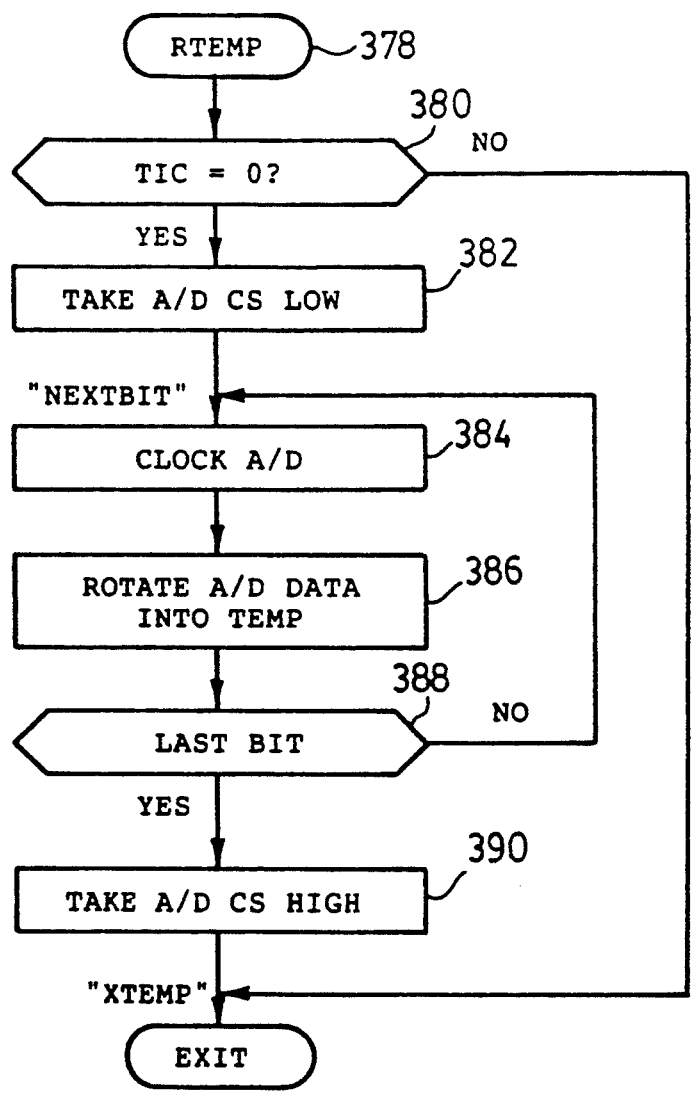
FIG. 10 is a flow chart depicting the software for inputting the current temperature reading from the temperature sensor.

The main loop 290 (FIG. 4) next (at block 326) calls a procedure 378 (FIG. 10) for reading the temperature from the temperature sensor 14. Referring to FIG. 10, the read temperature procedure 378 controls the A/D converter 192 that is connected to the temperature sensor 14. If the tick variable is not zero, i.e. 1 second has not elapsed, then the control returns to the main loop (block 380). Otherwise, the procedure selects the A/D converter (block 382) and reads in the serial data word corresponding to the temperature (blocks 384,386,388,390) and returns to the main loop 90.

Figure 11I:
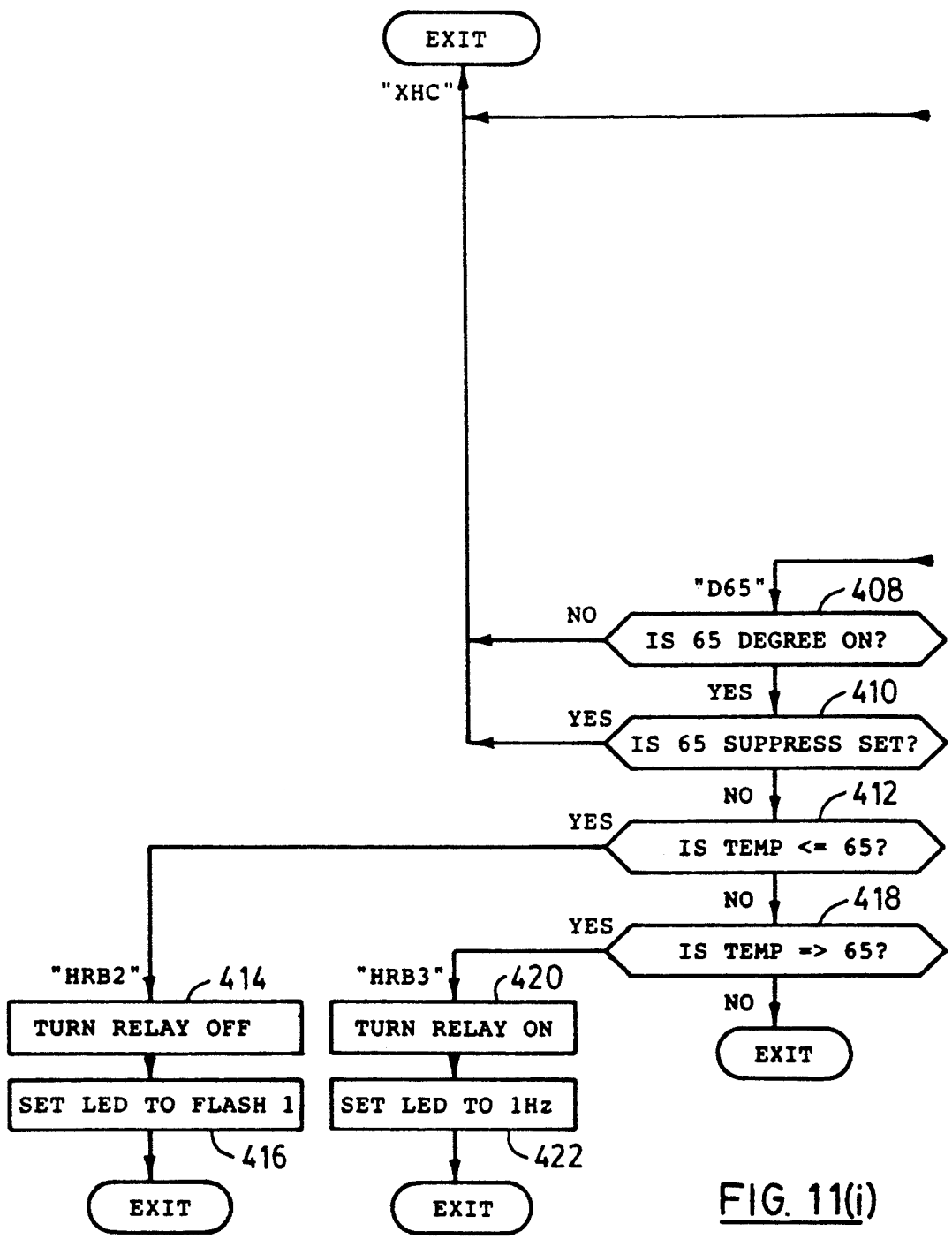
FIG. 11 is a flow chart depicting the software for controlling the heat-cycles.
Figure 11:
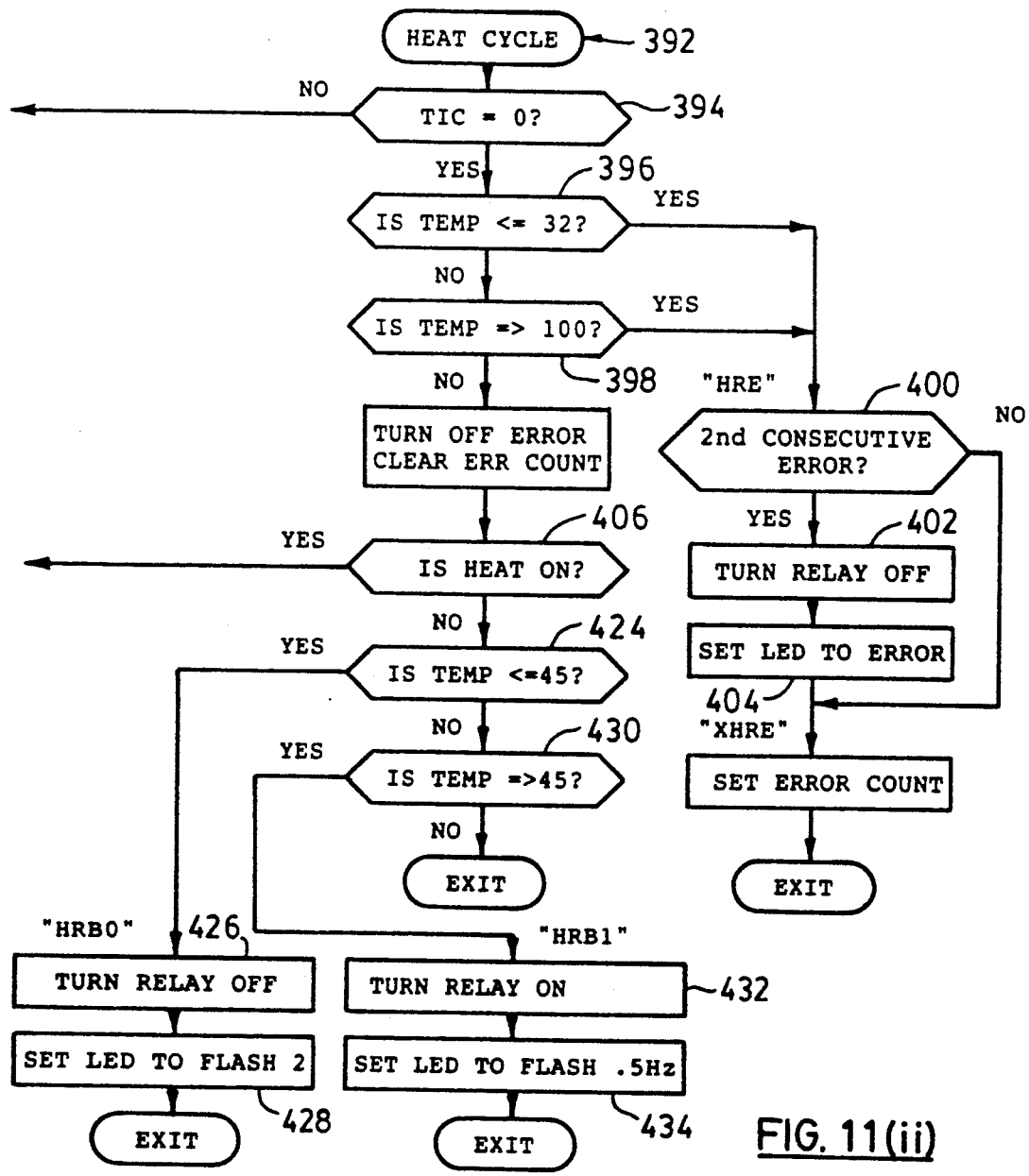

Referring back to FIG. 4, the next procedure called from the main loop 290 is a procedure (block 328) for controlling the heat cycles 392. The heat cycle procedure 392 is shown in FIG. 11. The principal function of the heat cycle procedure 392 is to control the heat relay 58 to maintain a temperature of either 65 degrees (i.e. 65-degree set-back) or 45 degrees (i.e. 45-degree set-back). The heat cycle procedure 392 executes every one second by checking the tick variable in block 394. If the tick variable is not equal to zero (i.e. one second has not elapsed since the last time the procedure was called), program execution returns to the main loop 290.

The next function performed by the heat cycle procedure 392 is to check for error conditions. In the preferred embodiment, there are two error conditions which are checked. The first error condition is the temperature being below 32 degrees, block 396. The second error condition is the temperature being above 100 degrees, block 398. If either error condition is true for two consecutive calls of the procedure (block 400), then the procedure clears the relay control bit in block 402 and sets the state of LED 168 to error in block 404. An error flash sequence, consisting of two quick flashes followed by a pause, is then set at block 405. The error condition can result from a defective temperature sensor, heating system or wiring.

Figure 13:
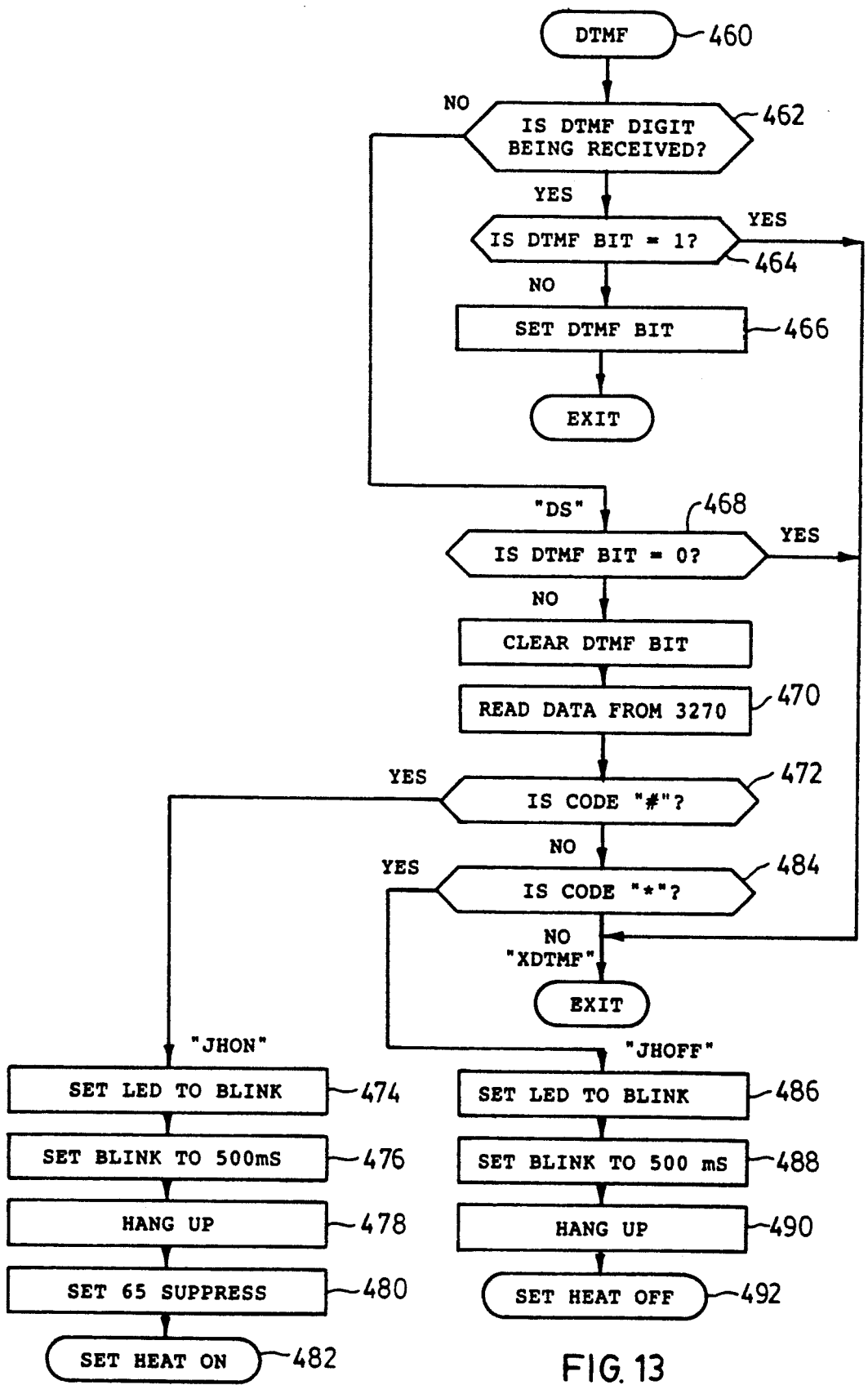
FIG. 13 is a flow chart depicting the software for receiving and processing key presses from a telephone.

If the heat is on (block 406) and there is no error condition, i.e. temperature is between 32 and 100 degrees, then the heat cycle procedure 392 checks whether the 65-degree set-back is active, in block 408. If the 65-degree set-back is active and the 65-degree set-back suppress is disabled in block 410 (i.e. heat cycle was not initiated by telephone), then the procedure 392 will control the heat relay 28 to maintain a room temperature of 65 degrees. The 65-degree set-back suppress is set in a procedure for processing touch tone inputs (FIG. 13). As will be discussed, the 65-degree set-back suppress is set (i.e. 65-degree set-back is disabled) if the heating equipment 22 is turned on by telephone. The telephone can be a remote or a local extension. Using a local extension, the heating equipment 22 can be activated from another room in the building. It will be appreciated that the 65-degree set-back suppress will be disabled as soon as the motion sensor 12 detects the presence of the person who used the local extension. If the room temperature as determined by the temperature reading procedure is less than or equal to 65 degrees (block 412), the procedure turns the heat relay off in block 44 (i.e. to activate the heating equipment), and sets the LED flash rate to 10 Hz, in block 416, to visually indicate the current state of the heat controller 10. If the room temperature is greater than 68 degrees (block 418), the procedure 392 turns the heat relay 28 on in block 420 and sets the LED flash rate to 1 Hz in block 412. Program execution then returns to the main loop 290.

If there are no error conditions and the heat is off, then the heat controller 10 must be in the 45-degree set-back mode, and the procedure will control the heat relay to maintain a room temperature of 45 degrees. If the room temperature is less than 45 degrees (block 424), then the procedure turns off the heat control relay in block 426 (by clearing the heat control bit) and sets the LED flash rate to 5 Hz in block 428. On the other hand, if the room temperature is greater than 48 degrees (block 430), the procedure turns on the heat control relay in block 432 and sets the LED flash rate to 0.5 Hz in block 434. Program execution then returns to the main loop 290.

In the main loop 290 (FIG. 4), the software next, at block 330, calls a procedure 436 (FIG. 12) to check if the telephone line is ringing. The primary function of the telephone ring procedure 436 is to monitor the line for ringing voltages and depending on the current heat cycle answer the line after a fixed number of rings. In addition, the telephone ring procedure 436 measures the duration of the voltage pulses to distinguish dial pulse signals from ringing voltage signals.

Figure 12:
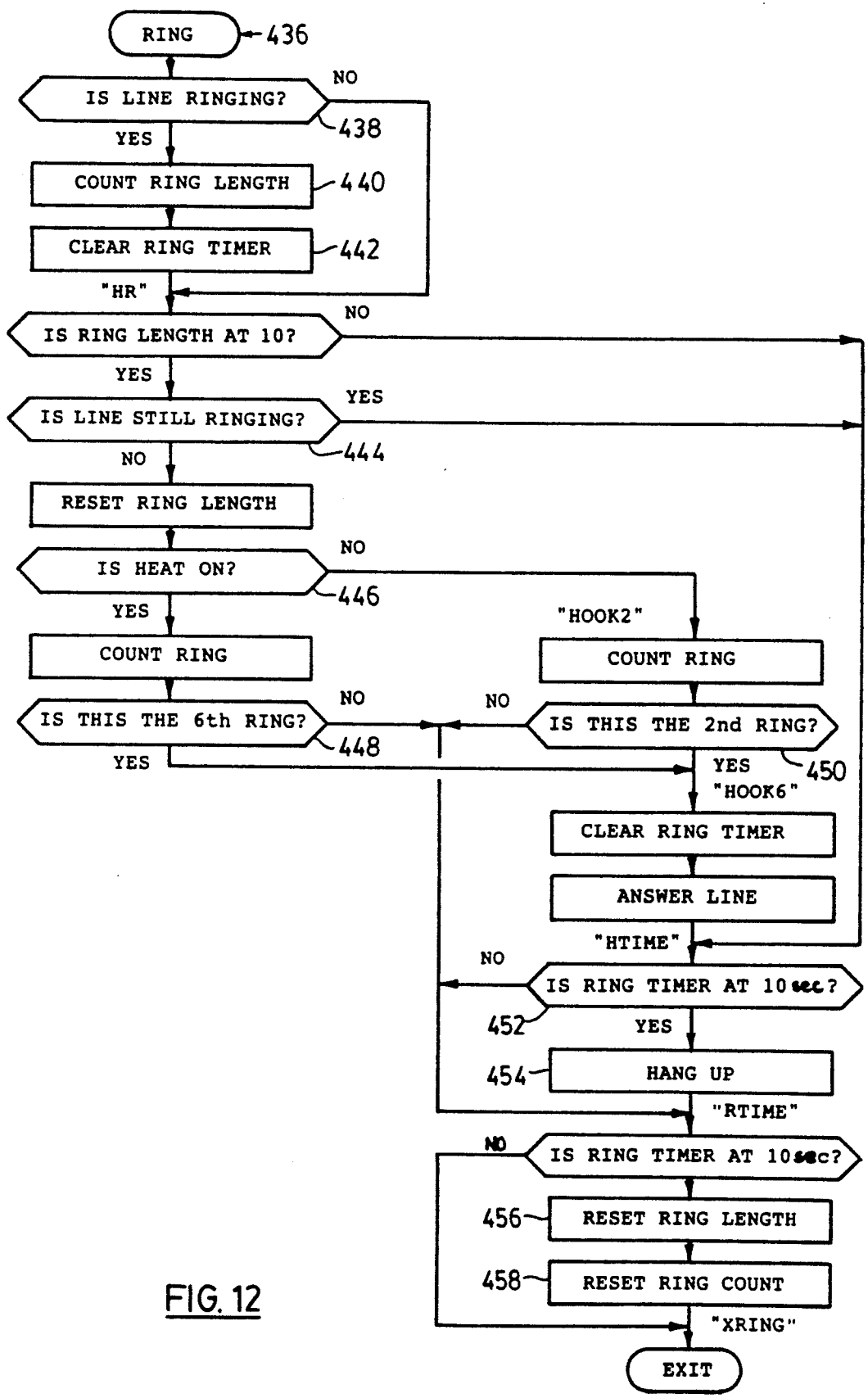
FIG. 12 is a flow chart depicting the software for controlling the telecommunications interface.

Referring to FIG. 12, the first operation in the procedure 436 is to determine if the line is ringing and the pulses on the line correspond to ringing voltages, blocks 438 and 440. The procedure also resets a ring timer in block 442. The ring timer is used to reset a ring counter and to hang up the line 10 seconds after the heat controller 10 has answered the line.

After the telephone line has stopped ringing (block 444), the procedure 436 counts the number of rings. If the heat is on (block 446), the line is answered after six rings (block 448). On the other hand, if the heat is off (block 446), then the line is answered after two rings (block 450). After the line has been answered subsequent calls of the procedure 436 from the main loop 290 will check if the ring timer is at 10 seconds in block 452. If 10 seconds have elapsed, then the procedure hangs up in block 454, resets the ring length and the ring count in blocks 456,458, and returns to the main loop 290.

The main loop 290 next, at block 332, calls a procedure 460 (FIG. 13) for processing incoming DTMF tones on the telephone line. The DTMF 460 procedure checks for incoming tones and acts on the tones for a "#" key-press and a "*" key-press. Referring to FIG. 13, the procedure 460 polls the DTMF decoder Chip 140 to check if a tone is present on the line, in block 462. If a tone is present, the procedure 460 will wait until the tone ends (blocks 464,466,468), i.e. the key is released, before reading the tone from the DTMF decoder 140 (block 470).

If the received tone corresponds to the "#" key (block 472), then the heat controller 10 turns on the heating equipment 22 to allow the room thermostat 20 to bring the temperature to the desired setting. The heat controller 10 also activates the 65-degree set-back suppress so that the heat controller 10 does not go to 65-degree set-back if there is no motion for two hours. Referring to FIG. 13, the procedure 460 sets the LED state control word to blink at 500 milliseconds (blocks 474,476), hangs up the line (block 478), and activates the 65-degree set-back suppress (block 480). Lastly, the procedure 460 calls (at block 482) the heat-on procedure 262 (FIG. 6) to control the heating equipment 22.

If the tone received corresponds to the "*" key (block 484), the heat controller 10 turns off the heating equipment 22, i.e. activates the 45-degree setback. Again referring to FIG. 13, the procedure 460 sets the LED state to blink at 500 milliseconds (blocks 486,488), hangs up the line (block 490) and calls (block 492) the heat-off procedure 264 (FIG. 7). After executing the heat-off procedure 264 (or heat-on procedure 262) control returns to the main loop 290.

Figure 14:
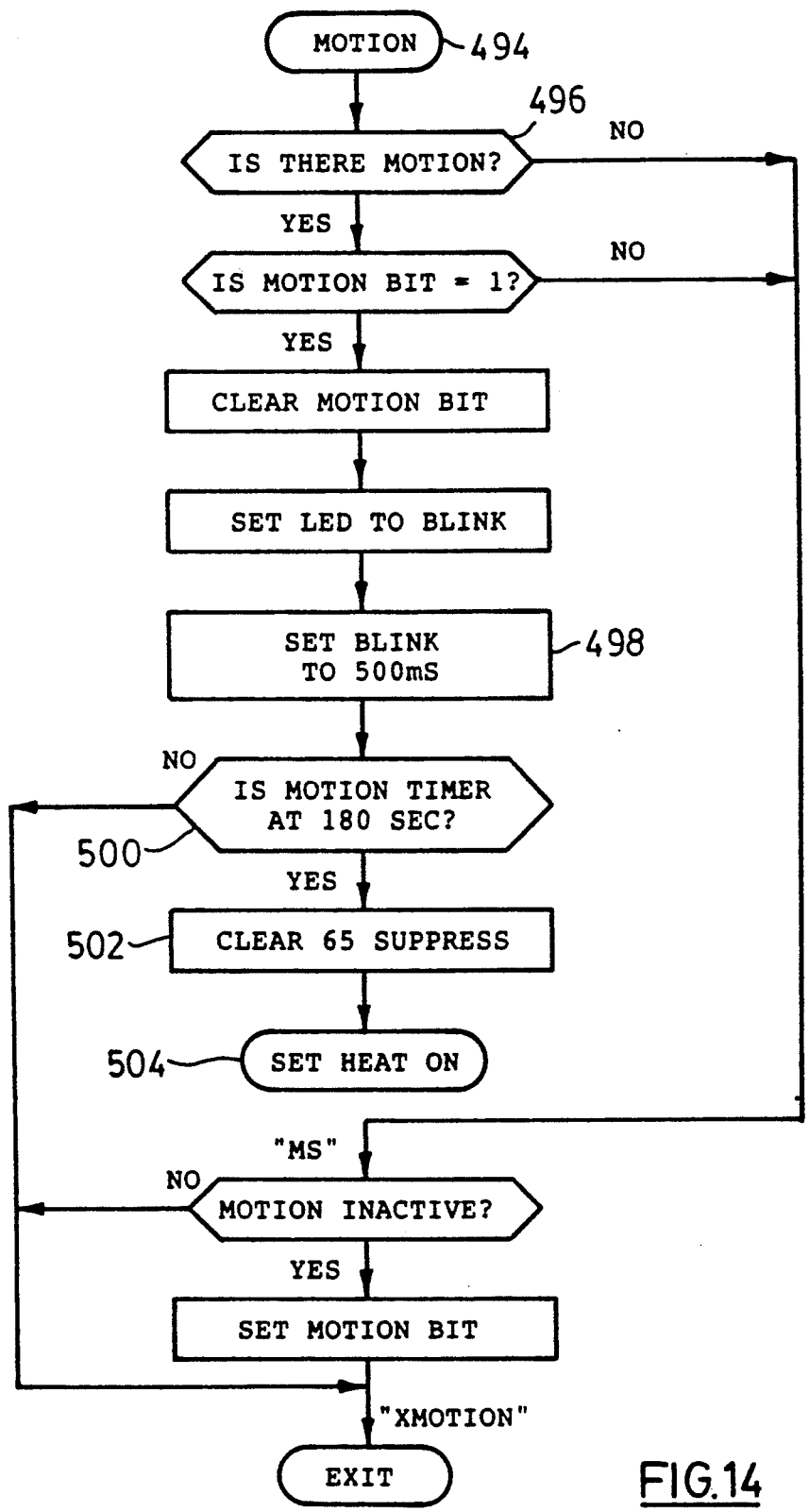
FIG. 14 is a flow chart depicting the software for controlling the motion sensor.

The main loop 290 (FIG. 4) next calls (at block 334) a procedure 494 (FIG. 14) for checking for motion in the room. The primary function of the motion procedure 494 is to check if there is any motion in the room, and if there is motion, the heat controller 10 resets the heat cycle time. As shown in FIG. 14, the first operation (blocks 496,498) in the procedure 494 involves polling the motion sensor 12 to check if there is motion. If there is no motion, the procedure 494 is exited, block 496. If there is motion, the procedure 494 sets the LED state to blink at 500 milliseconds (block 498). The procedure 494 then checks if the motion sensor 12 is disabled, i.e. have 3 minutes lapsed, in block 500. The motion sensor 12 is disabled for 3 minutes any time the heat cycle has been terminated (either by the telephone or time-out). If 3 minutes have elapsed, the procedure 494 disables the 65-degree set-back suppress (block 502) and calls the heat-on procedure (block 504).

Figure 15:
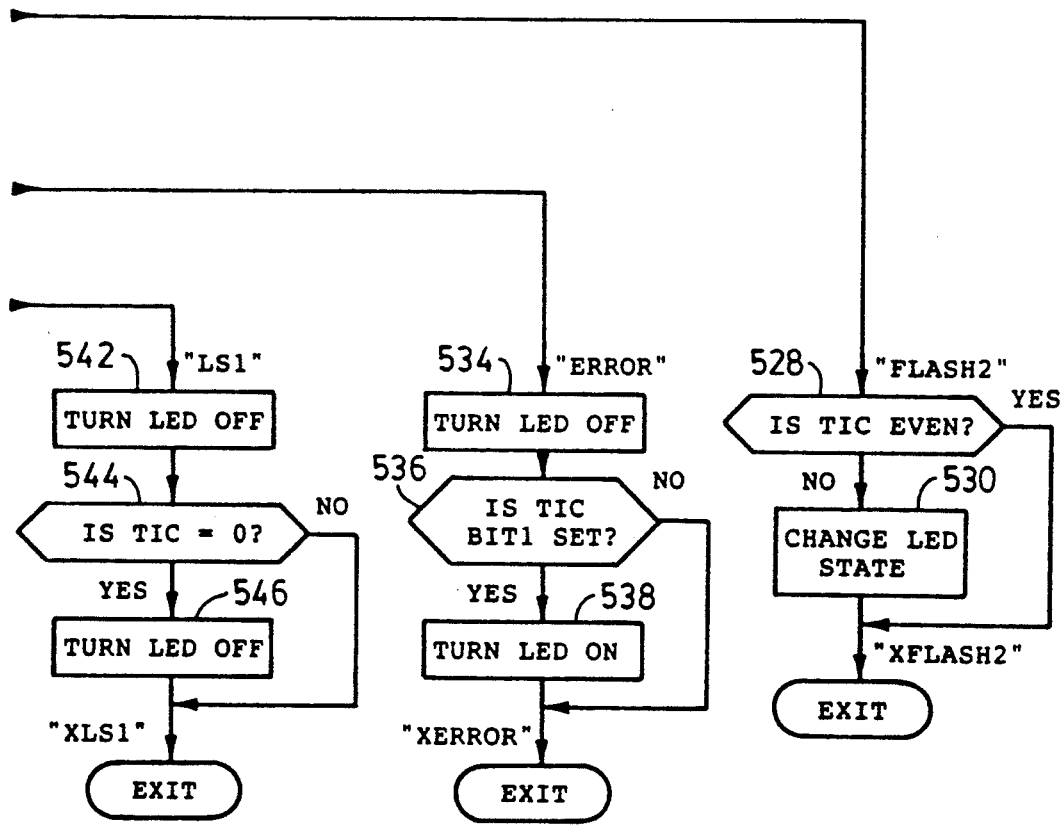
FIG. 15 is a flow chart depicting the software for controlling the LED indicator.
Figure 15I:
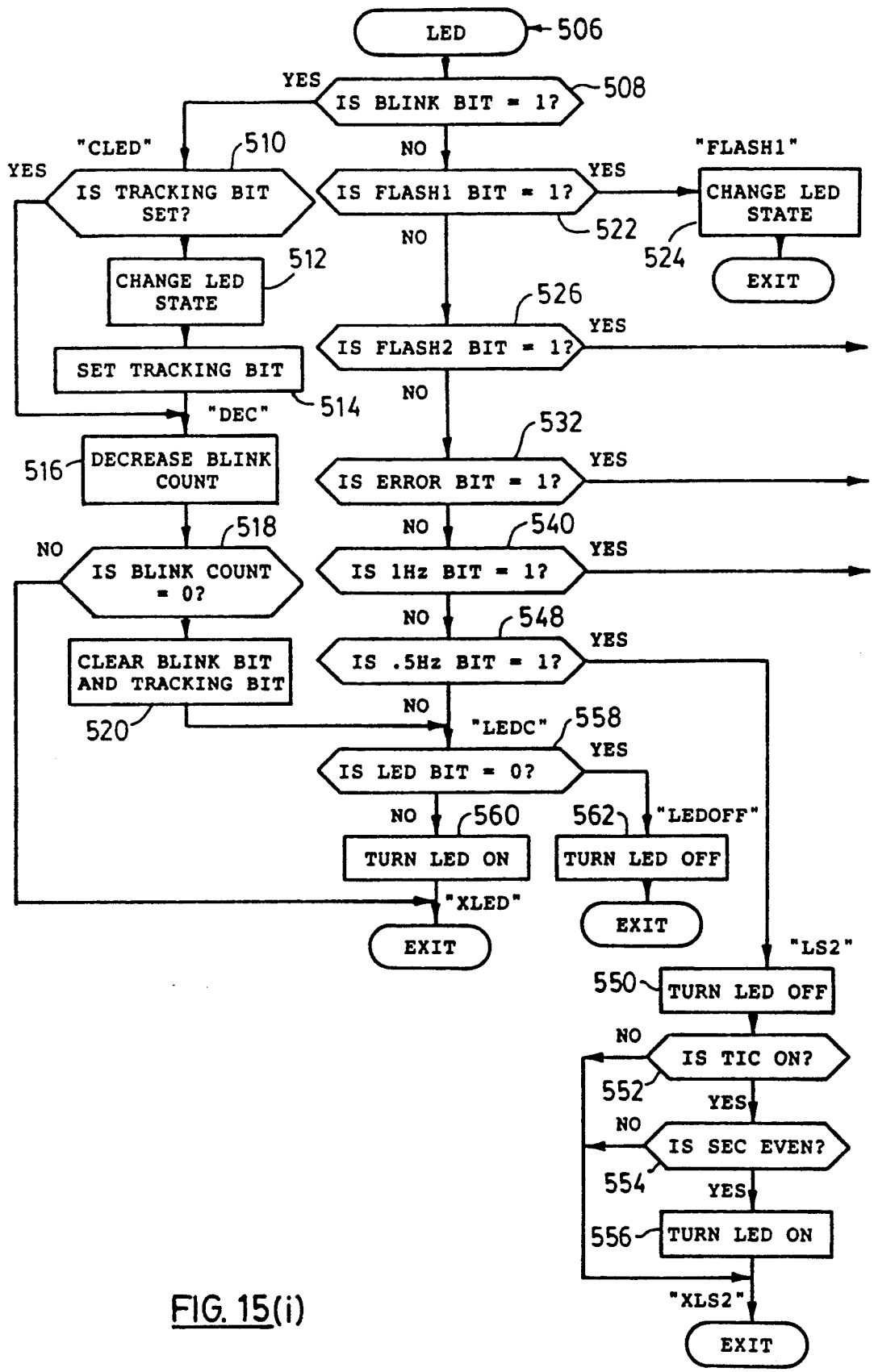

The last procedure called by the main loop 290 is (at block 336 in FIG. 4) a procedure 506 (FIG. 5) for controlling the LED 168. The LED 168 serves as a status indicator for the heat controller 10, i.e. each mode of the heat controller 10 has a specific LED blink or LED state (e.g. flash, steady-on, off). Referring to FIG. 15, the LED procedure 506 uses the LED state word (introduced above) and another variable called BCOUNT to control the LED. The LED state is set by each procedure according to the status of the heat controller 10, for example, the motion procedure 494 sets the LED state to blink. The procedure 506 uses the BCOUNT variable to make the LED 168 blink once for a specific duration. For example, the motion procedure 494 sets the BCOUNT variable to 500 milliseconds.

As shown in FIG. 15, the procedure 506 includes a branch for controlling each LED state. The LED procedure 506 first looks at the blink-bit in block 508. If the blink-bit is set, then the procedure 506 uses the output line 178 to make the LED 168 blink. By toggling the LED on and off (blocks 510 to 514), the procedure 506 makes the LED blink. The duration of each toggle, i.e. LED on or off, is determined by the value of the BCOUNT variable (blocks 516 and 518). The blink state is turned off by clearing a LED enable bit in the control word (block 520). As discussed above, each bit in the LED control word corresponds to a LED state (e.g. flash at 10 Hz and flash at 0.5 Hz).

The LED procedure 506 next checks the 10 Hz flash-bit in block 522. If the 10 Hz flash-bit is set, the procedure 506 toggles the state of the LED 168 using the output line (block 524). If the 10 Hz flash-bit is zero, the procedure checks the 5 Hz flash-bit in block 526. If the 5 Hz flash-bit is set, the procedure 506 uses an even value of the "tick" time-base (block 528) to toggle the state of the LED (block 30). If the error-bit is set, e.g. indicating a wiring failure (block 532), then the procedure 506 toggles the LED 168 between off and two quick flashes (blocks 534 to 546). If the 1 Hz bit is set (block 540), then the procedure toggles the LED on and off using the tick as the one second time-base (blocks 542 to 546). If the 0.5 Hz bit is set (block 540), then the procedure 506 toggles the LED 168 on and off using the even value of the seconds variable to establish the two second time-base (blocks 550 to 556). Lastly, if the LED enable bit is set (block 558), the procedure turns the LED on by bringing the output line 178 high (block 560), otherwise the LED 168 is turned off (block 562). As for the other procedures, the LED procedure is called every 50 milliseconds.

It will be evident to those skilled in the art that other embodiments of the invention fall within its spirit and scope as defined by the following claims.

We claim:

1. A system for controlling temperature change means which heats and/or cools a space, said system being responsive to control by a telephone connected to a telephone network, said system comprising:
   (a) controller means coupled to said temperature change means for controlling the operation of said temperature change equipment;
   (b) a temperature sensor, said temperature sensor coupled to said controller means, said temperature sensor having means for generating an output signal corresponding to a temperature sensed by said temperature sensor;
   (c) presence detector means coupled to said controller means and operated to generate a presence output signal representative of the presence or absence of the person in said space;
   (d) telecommunications interface means coupling said telephone system to said controller means;
   (e) said telecommunications interface means including means for receiving and answering a call from said telephone and further including means for receiving and decoding digits received from said telephone and for producing a communication signal dependent on such digits;
   (f) said controller means including means responsive to said temperature output signal and said communication signal for operating said temperature change means to change the temperature in said space dependent on the digits received from said telephone;
   (g) said controller means including setback means responsive to said presence output signal for operating said temperature change means at a first temperature setback level if no presence is detected in said space for a predetermined period of time; and
   (h) said controller means including means responsive to receipt of a communication signal representative of at least one selected digit for disabling said setback means for at least a first selected period of time, wherein said first selected period of time is greater than said predetermined period of time so that the temperature in said space will be restored from said setback temperature even in the absence of a person in said space.

2. A system according to claim 1 wherein said temperature change means comprises heating means.

3. A system according to claim 1 wherein said temperature change means comprises cooling means.

4. A system according to claim 1 wherein said controller means includes means responsive to a communication signal for suppressing said presence output signal for a second selected period of time upon receipt of said communication signal, said second selected period of time being shorter than said first selected period of time.

5. A system according to claim 1 wherein said telecommunication interface means includes means adapted to receiving a signal transmitted from an extension telephone in said space without ringing of said extension telephone, so that said temperature change means can be controlled from said extension telephone and from a telephone located outside said space.

6. A system according to claim 1 wherein said telecommunication interface means includes means responsive to the state of said temperature change means to answer a call from said telephone in a first selected number of rings if said temperature change means is not operating, and in a second and larger selected number of rings if said temperature change means is operating.

7. A system according to claim 1 wherein said temperature change means includes a thermostat for controlling said temperature change means, and said controller means includes relay means connected in series with said thermostat such that said thermostat controls said temperature change means when said relay is closed, said controller means including means for providing a pulsed signal to said relay means to open said relay means.

8. A method of controlling the temperature in a space having a temperature change device for heating and/or cooling said space, and a temperature controller including presence sensing means for detecting the presence or absence of a person in said space and for automatically setting back the temperature in said space to a setback temperature if no person is present in said space for a predetermined period of time, said method including the steps of communicating with the said temperature controller by telephone to restore the temperature in said space from said setback temperature, and concurrently disabling for a selected period of time which is greater than said predetermined period of time the step of automatically setting back the temperature in said space if no person is present in said space for said predetermined period of time, so that the temperature in said space will be restored from said setback temperature even in the absence of the person in said space.

9. A method according to claim 8 and including the step of communicating with said controller by telephone to change the temperature in said space, and concurrently disabling said presence sensor for a selected period of time.

10. A method according to claim 8 and including the step of communicating with said temperature controller from an extension telephone located in said space.

* * * * *